(12) United States Patent
Wells et al.

(10) Patent No.: US 10,249,129 B2
(45) Date of Patent: *Apr. 2, 2019

(54) VIDEO PROCESSING AND SIGNAL ROUTING APPARATUS FOR PROVIDING PICTURE IN A PICTURE CAPABILITIES ON AN ELECTRONIC GAMING MACHINE

(71) Applicant: IGT, Las Vegas, NV (US)

(72) Inventors: William R. Wells, Carson City, NV (US); Ali Saffari, Reno, NV (US); Christopher Lundy, Reno, NV (US); Craig A Paulsen, Reno, NV (US); Andrew George Novotak, Jr., Reno, NV (US); Thomas Quick, Carson City, NV (US)

(73) Assignee: IGT, Las Vegas, NV (US)

(*) Notice: Subject to any disclaimer, the term of this patent is extended or adjusted under 35 U.S.C. 154(b) by 337 days.

This patent is subject to a terminal disclaimer.

(21) Appl. No.: 14/608,149

(22) Filed: Jan. 28, 2015

(65) Prior Publication Data

US 2015/0141132 A1    May 21, 2015

Related U.S. Application Data

(63) Continuation of application No. 14/027,112, filed on Sep. 13, 2013, now Pat. No. 8,968,086, which is a
(Continued)

(51) Int. Cl.
*G07F 17/00* (2006.01)
*G07F 17/32* (2006.01)
(Continued)

(52) U.S. Cl.
CPC ......... *G07F 17/3211* (2013.01); *G06Q 20/10* (2013.01); *G07F 9/026* (2013.01);
(Continued)

(58) Field of Classification Search
CPC ............. G07F 17/3211; G07F 17/3223; G07F 17/3225; G07F 17/3202; G07F 17/3241; G07F 9/026; G07F 17/323; G06C 20/10
See application file for complete search history.

(56) References Cited

U.S. PATENT DOCUMENTS 5,091,713 A    2/1992 Horne et al.
5,259,613 A    11/1993 Marnell
(Continued)

FOREIGN PATENT DOCUMENTS

EP    0744786 A1    11/1996
EP    1074955 A2    2/2001
(Continued)

OTHER PUBLICATIONS

"U.S. Appl. No. 14/949,982, Non Final Office Action dated Mar. 11, 2016", 7 pgs.
(Continued)

*Primary Examiner* — Dmitry Suhol
*Assistant Examiner* — Carl V Larsen
(74) *Attorney, Agent, or Firm* — Neal, Gerber & Eisenberg LLP

(57) ABSTRACT

A gaming system used in a wager-based electronic gaming machine is described. The gaming system is configured to provide picture in a picture capabilities on the electronic gaming machine. In one embodiment, the gaming system can include a first gaming device and a second gaming device where the first gaming device controls the second gaming device. The first gaming device can be configured to receive data and/or communicate with an electronic gaming machine controller, a value input device and value output device. The second gaming device can be configured to receive touchscreen data from a touchscreen display and first video data from the first gaming device and second video
(Continued)

data from the EGM controller. Under control of the first gaming device, the first video data and second video data can be output in various sizes and locations on the touchscreen display.

23 Claims, 12 Drawing Sheets

Related U.S. Application Data continuation-in-part of application No. 13/327,584, filed on Dec. 15, 2011, now Pat. No. 8,814,681, which is a continuation-in-part of application No. 12/943,789, filed on Nov. 10, 2010, now Pat. No. 8,088,014.

(60) Provisional application No. 61/801,122, filed on Mar. 15, 2013, provisional application No. 61/708,519, filed on Oct. 1, 2012, provisional application No. 61/303,106, filed on Feb. 10, 2010.

(51) Int. Cl.
*G07F 9/02* (2006.01)
*G06Q 20/10* (2012.01)

(52) U.S. Cl.
CPC ........ *G07F 17/3202* (2013.01); *G07F 17/323* (2013.01); *G07F 17/3223* (2013.01); *G07F 17/3225* (2013.01); *G07F 17/3241* (2013.01)

(56) References Cited

U.S. PATENT DOCUMENTS

| | | | |
|---|---|---|---|
| 5,342,047 A | 8/1994 | Heidel et al. | |
| 5,412,404 A | 5/1995 | Candy | |
| 5,450,938 A | 9/1995 | Rademacher | |
| 5,531,309 A | 7/1996 | Kloss et al. | |
| 5,605,506 A | 2/1997 | Hoorn et al. | |
| 5,611,730 A | 3/1997 | Weiss et al. | |
| 5,655,961 A | 8/1997 | Acres et al. | |
| 5,769,269 A | 6/1998 | Peters et al. | |
| 5,844,808 A | 12/1998 | Konsmo et al. | |
| 5,908,354 A | 6/1999 | Okuniewicz | |
| 6,146,276 A | 11/2000 | Okuniewicz | |
| 6,249,885 B1 | 6/2001 | Johnson et al. | |
| 6,286,756 B1 | 9/2001 | Stinson et al. | |
| 6,354,749 B1 | 3/2002 | Pfaffenberger, II | |
| 6,379,246 B1* | 4/2002 | Dabrowski | G07F 5/24 |
| | | | 463/16 |
| 6,533,659 B2 | 3/2003 | Seymour et al. | |
| 6,548,967 B1 | 4/2003 | Dowling et al. | |
| 6,638,170 B1 | 10/2003 | Crumby | |
| 6,846,238 B2 | 1/2005 | Wells | |
| 6,854,645 B1 | 2/2005 | Somers, Jr. et al. | |
| 6,897,624 B2 | 5/2005 | Lys et al. | |
| 6,924,903 B2 | 8/2005 | Brooks et al. | |
| 6,997,803 B2 | 2/2006 | LeMay et al. | |
| 7,014,563 B2 | 3/2006 | Stephan et al. | |
| 7,051,221 B2 | 5/2006 | Clabes et al. | |
| 7,099,035 B2 | 8/2006 | Brooks et al. | |
| D529,966 S | 10/2006 | LeSourd et al. | |
| D536,389 S | 2/2007 | LeSourd et al. | |
| D536,742 S | 2/2007 | Kaminkow et al. | |
| 7,178,941 B2 | 2/2007 | Roberge et al. | |
| 7,202,613 B2 | 4/2007 | Morgan et al. | |
| 7,213,812 B2 | 5/2007 | Schubert et al. | |
| 7,270,605 B2 | 9/2007 | Russell et al. | |
| 7,290,072 B2 | 10/2007 | Quraishi et al. | |
| 7,309,965 B2 | 12/2007 | Dowling et al. | |
| 7,311,598 B2 | 12/2007 | Kaminkow et al. | |
| 7,311,604 B2 | 12/2007 | Kaminkow et al. | |
| 7,335,106 B2 | 2/2008 | Johnson | |
| 7,385,359 B2 | 6/2008 | Dowling et al. | |
| 7,390,257 B2 | 6/2008 | Paulsen et al. | |
| 7,442,125 B2 | 10/2008 | Paulsen et al. | |
| 7,529,868 B2 | 5/2009 | Brooks et al. | |
| 7,550,931 B2 | 6/2009 | Lys et al. | |
| 7,641,554 B2 | 1/2010 | Paulsen et al. | |
| 7,642,730 B2 | 1/2010 | Dowling et al. | |
| 7,646,029 B2 | 1/2010 | Mueller et al. | |
| 7,689,167 B2 | 3/2010 | Sengupta et al. | |
| 7,704,147 B2 | 4/2010 | Quraishi et al. | |
| 7,764,026 B2 | 7/2010 | Dowling et al. | |
| 7,803,053 B2 | 9/2010 | Atkinson et al. | |
| 8,075,408 B2 | 12/2011 | Hwang | |
| 8,083,592 B2 | 12/2011 | Wells | |
| 8,088,014 B2 | 1/2012 | Wells | |
| 8,241,123 B2* | 8/2012 | Kelly | G07F 17/3267 |
| | | | 463/34 |
| 8,241,124 B2 | 8/2012 | Kelly et al. | |
| 8,371,937 B2 | 2/2013 | Wells | |
| 8,460,091 B2 | 6/2013 | Wells et al. | |
| 8,479,908 B2 | 7/2013 | Wells et al. | |
| 8,512,144 B2 | 8/2013 | Johnson et al. | |
| 8,579,711 B2 | 11/2013 | Nguyen et al. | |
| 8,585,479 B2 | 11/2013 | Ryan et al. | |
| 8,616,968 B2 | 12/2013 | Tripp | |
| 8,696,430 B2 | 4/2014 | Wells | |
| 8,696,449 B2 | 4/2014 | Wells | |
| 8,721,449 B2 | 5/2014 | Johnson et al. | |
| 8,784,196 B2 | 7/2014 | Little et al. | |
| 8,784,213 B2 | 7/2014 | Johnson | |
| 8,814,681 B2 | 8/2014 | Wells et al. | |
| 8,814,706 B2 | 8/2014 | Wells et al. | |
| 8,882,589 B2 | 11/2014 | Wells | |
| 8,888,600 B2* | 11/2014 | Nguyen | G07F 17/32 |
| | | | 463/43 |
| 8,968,086 B2 | 3/2015 | Wells et al. | |
| 9,123,203 B2 | 9/2015 | Johnson | |
| 9,240,100 B2 | 1/2016 | Page et al. | |
| 9,245,419 B2 | 1/2016 | Saffari et al. | |
| 9,564,004 B2 | 2/2017 | Johnson | |
| 9,613,419 B2 | 4/2017 | Roth | |
| 2001/0036866 A1 | 11/2001 | Stockdale et al. | |
| 2002/0016829 A1 | 2/2002 | Defosse | |
| 2002/0115487 A1 | 8/2002 | Wells | |
| 2002/0128932 A1 | 9/2002 | Yung et al. | |
| 2002/0132663 A1 | 9/2002 | Cumbers | |
| 2002/0155887 A1* | 10/2002 | Criss-Puszkiewicz | |
| | | | G07F 17/32 |
| | | | 463/29 |
| 2003/0054880 A1 | 3/2003 | Lam et al. | |
| 2003/0074106 A1 | 4/2003 | Butler | |
| 2003/0081824 A1 | 5/2003 | Mennie et al. | |
| 2003/0109302 A1 | 6/2003 | Rist | |
| 2003/0109307 A1 | 6/2003 | Boyd | |
| 2003/0190958 A1 | 10/2003 | Paulsen | |
| 2003/0195037 A1 | 10/2003 | Vuong et al. | |
| 2004/0014526 A1 | 1/2004 | Kulas | |
| 2004/0043814 A1* | 3/2004 | Angell | G07F 17/0014 |
| | | | 463/25 |
| 2004/0082385 A1 | 4/2004 | Silva et al. | |
| 2004/0132532 A1 | 7/2004 | Brosnan et al. | |
| 2004/0146975 A1 | 7/2004 | Yaver et al. | |
| 2004/0153748 A1 | 8/2004 | Fabrizi et al. | |
| 2004/0166917 A1 | 8/2004 | Lam et al. | |
| 2004/0166932 A1 | 8/2004 | Lam et al. | |
| 2004/0171423 A1 | 9/2004 | Silva et al. | |
| 2004/0238319 A1 | 12/2004 | Hand | |
| 2004/0254006 A1 | 12/2004 | Lam et al. | |
| 2004/0254013 A1 | 12/2004 | Quraishi et al. | |
| 2005/0003890 A1 | 1/2005 | Hedrick et al. | |
| 2005/0020358 A1* | 1/2005 | Cram | G07F 17/32 |
| | | | 463/31 |
| 2005/0041161 A1 | 2/2005 | Dowling et al. | |
| 2005/0043086 A1 | 2/2005 | Schneider | |
| 2005/0061605 A1 | 3/2005 | Bell et al. | |
| 2005/0099824 A1 | 5/2005 | Dowling et al. | |
| 2005/0153776 A1 | 7/2005 | LeMay et al. | |
| 2005/0159203 A1 | 7/2005 | Bond | |
| 2005/0184868 A1 | 8/2005 | Mercado et al. | |
| 2005/0207129 A1* | 9/2005 | Fiorentino | G06F 1/188 |
| | | | 361/752 |

(56) References Cited

U.S. PATENT DOCUMENTS

| | | |
|---|---|---|
| 2005/0216120 A1 | 9/2005 | Rosenberg et al. |
| 2005/0248299 A1 | 11/2005 | Chemel et al. |
| 2005/0261057 A1 | 11/2005 | Bleich et al. |
| 2005/0275626 A1 | 12/2005 | Mueller et al. |
| 2005/0277471 A1 | 12/2005 | Russell et al. |
| 2005/0282631 A1 | 12/2005 | Bonney et al. |
| 2006/0035707 A1 | 2/2006 | Nguyen et al. |
| 2006/0046819 A1 | 3/2006 | Nguyen et al. |
| 2006/0046849 A1 | 3/2006 | Kovacs |
| 2006/0063594 A1 | 3/2006 | Benbrahim et al. |
| 2006/0073869 A1 | 4/2006 | LeMay et al. |
| 2006/0073888 A1 | 4/2006 | Nguyen et al. |
| 2006/0166741 A1 | 7/2006 | Boyd et al. |
| 2006/0178190 A9 | 8/2006 | Okuniewicz |
| 2006/0189391 A1 | 8/2006 | Bird et al. |
| 2006/0217172 A1 | 9/2006 | Roireau |
| 2006/0219777 A1 | 10/2006 | Aror et al. |
| 2006/0221386 A1 | 10/2006 | Brooks et al. |
| 2006/0287095 A1 | 12/2006 | Mattice et al. |
| 2007/0010318 A1 | 1/2007 | Rigsby et al. |
| 2007/0021215 A1 | 1/2007 | Russell et al. |
| 2007/0050443 A1 | 3/2007 | Ewing et al. |
| 2007/0084978 A1 | 4/2007 | Martin et al. |
| 2007/0111796 A1 | 5/2007 | Giaimo et al. |
| 2007/0119681 A1 | 5/2007 | Blake et al. |
| 2007/0123335 A1 | 5/2007 | Okada |
| 2007/0129136 A1 | 6/2007 | Walker et al. |
| 2007/0155469 A1 | 7/2007 | Johnson et al. |
| 2007/0189026 A1 | 8/2007 | Chemel et al. |
| 2007/0230113 A1* | 10/2007 | Chiang .......... G06F 1/181 361/679.47 |
| 2007/0243925 A1 | 10/2007 | LeMay et al. |
| 2007/0243934 A1 | 10/2007 | Little et al. |
| 2008/0020838 A1 | 1/2008 | Slattery |
| 2008/0039972 A1 | 2/2008 | Walker |
| 2008/0045345 A1 | 2/2008 | Bird |
| 2008/0058056 A1 | 3/2008 | Johnson |
| 2008/0076506 A1 | 3/2008 | Nguyen et al. |
| 2008/0076512 A1 | 3/2008 | Aida |
| 2008/0113767 A1 | 5/2008 | Nguyen et al. |
| 2008/0113802 A1 | 5/2008 | Johnson et al. |
| 2008/0119284 A1 | 5/2008 | Luciano, Jr. et al. |
| 2008/0194329 A1 | 8/2008 | Page et al. |
| 2008/0207335 A1 | 8/2008 | DiMichele |
| 2008/0215391 A1 | 9/2008 | Dowling et al. |
| 2008/0242408 A1 | 10/2008 | Hwang |
| 2008/0274795 A1 | 11/2008 | Carpenter et al. |
| 2008/0293494 A1 | 11/2008 | Adiraju et al. |
| 2008/0300046 A1 | 12/2008 | Gagner et al. |
| 2008/0313636 A1 | 12/2008 | Goldstein et al. |
| 2009/0029770 A1 | 1/2009 | Nagano |
| 2009/0058884 A1 | 3/2009 | Li |
| 2009/0069094 A1 | 3/2009 | Brosnan et al. |
| 2009/0082079 A1 | 3/2009 | Kuhn et al. |
| 2009/0094081 A1 | 4/2009 | Wittern et al. |
| 2009/0098943 A1 | 4/2009 | Weber et al. |
| 2009/0104960 A1 | 4/2009 | Kelly et al. |
| 2009/0124329 A1 | 5/2009 | Palmisano |
| 2009/0137318 A1 | 5/2009 | Russo et al. |
| 2009/0138638 A1 | 5/2009 | Russo et al. |
| 2009/0149253 A1* | 6/2009 | Kelly .......... G07F 17/3211 463/36 |
| 2009/0149261 A1 | 6/2009 | Chen et al. |
| 2009/0172980 A1 | 7/2009 | Heather et al. |
| 2009/0174346 A1 | 7/2009 | Hwang et al. |
| 2009/0197673 A1 | 8/2009 | Bone et al. |
| 2009/0233705 A1 | 9/2009 | LeMay et al. |
| 2009/0247281 A1 | 10/2009 | Voutes |
| 2009/0270159 A1 | 10/2009 | Kato et al. |
| 2009/0270167 A1 | 10/2009 | Ajiro et al. |
| 2009/0276640 A1 | 11/2009 | Wu |
| 2009/0294243 A1 | 12/2009 | Charych et al. |
| 2009/0307505 A1 | 12/2009 | Robertson et al. |
| 2009/0325686 A1 | 12/2009 | Davis et al. |
| 2010/0016073 A1 | 1/2010 | Goldstein et al. |
| 2010/0020546 A1 | 1/2010 | Kukita |
| 2010/0075753 A1 | 3/2010 | Atkinson |
| 2010/0081500 A1 | 4/2010 | Phillips et al. |
| 2010/0105454 A1 | 4/2010 | Weber et al. |
| 2010/0120518 A1 | 5/2010 | Borissov et al. |
| 2010/0124983 A1* | 5/2010 | Gowin .......... G07F 17/3223 463/25 |
| 2010/0124990 A1 | 5/2010 | Crowder |
| 2010/0127634 A1 | 5/2010 | Dowling et al. |
| 2010/0130278 A1 | 5/2010 | Shimabukuro et al. |
| 2010/0130284 A1 | 5/2010 | Luciano, Jr. et al. |
| 2010/0197404 A1 | 8/2010 | Lum et al. |
| 2010/0203961 A1 | 8/2010 | Burke et al. |
| 2010/0255902 A1 | 10/2010 | Goldstein et al. |
| 2010/0285866 A1 | 11/2010 | Bleich et al. |
| 2011/0032070 A1 | 2/2011 | Bleile |
| 2011/0207530 A1 | 8/2011 | Chudek et al. |
| 2011/0314153 A1 | 12/2011 | Bathiche et al. |
| 2012/0030459 A1* | 2/2012 | Aldridge .......... H04L 63/0485 713/153 |
| 2012/0122584 A1 | 5/2012 | Nguyen |
| 2012/0142403 A1 | 6/2012 | Prather et al. |
| 2012/0142412 A1 | 6/2012 | Carson, Jr. et al. |
| 2013/0084951 A1 | 4/2013 | Davis et al. |
| 2013/0123010 A1* | 5/2013 | Steil .......... G07F 17/323 463/31 |
| 2013/0130790 A1 | 5/2013 | Wells |
| 2013/0137510 A1 | 5/2013 | Weber |
| 2013/0225279 A1 | 8/2013 | Patceg et al. |
| 2013/0244756 A1 | 9/2013 | Wells |
| 2013/0252712 A1 | 9/2013 | Wells et al. |
| 2013/0275308 A1 | 10/2013 | Paraskeva et al. |
| 2014/0031119 A1 | 1/2014 | Wells et al. |
| 2014/0031125 A1 | 1/2014 | Wells et al. |
| 2014/0087849 A1 | 3/2014 | Page et al. |
| 2014/0094272 A1 | 4/2014 | Kelly et al. |
| 2014/0110468 A1 | 4/2014 | Kandregula |
| 2014/0200067 A1 | 7/2014 | Wells |
| 2014/0315620 A1 | 10/2014 | Wells |
| 2014/0329583 A1 | 11/2014 | Little et al. |
| 2014/0349729 A1 | 11/2014 | Roth |
| 2015/0243122 A1 | 8/2015 | Saffari et al. |
| 2016/0078724 A1 | 3/2016 | Saffari et al. |
| 2016/0260283 A1 | 9/2016 | Little et al. |

FOREIGN PATENT DOCUMENTS

| | | |
|---|---|---|
| EP | 2009602 A2 | 12/2008 |
| JP | 56168275 A | 12/1981 |
| WO | WO97/27576 | 7/1997 |
| WO | WO2007/146316 A2 | 12/2007 |

OTHER PUBLICATIONS

"U.S. Appl. No. 14/949,982, Notice of Allowance dated Jul. 7, 2016", 8 pages.

"U.S. Appl. No. 14/970,332, Non Final Office Action dated May 4, 2016", 11 pages.

"U.S. Appl. No. 14/970,332, Notice of Publication dated Apr. 7, 2016", dated Apr. 7, 2016, 1 page.

"U.S. Appl. No. 14/043,724, Notice of Allowance dated Sep. 14, 2015", 10 pgs.

"U.S. Appl. No. 14/710,549, Notice of Allowance dated Oct. 27, 2015", 10 pgs.

"20.3 Service Light Removal and Installation, Maintenance Procdures Game King Plus 19" Upright, International Game Technology. IGT Part No. 821-353-00., Oct. 1, 2001, 247-248.

"U.S. Appl. No. 13/327,584, Final Office Action dated Dec. 26, 2013".

"U.S. Appl. No. 13/327,584, Notice of Allowance dated May 16, 2014".

"U.S. Appl. No. 13/738,774, Non Final Office Action dated Jul. 19, 2013".

"U.S. Appl. No. 13/738,774, Notice of Allowance dated Jan. 14, 2014".

(56) References Cited

OTHER PUBLICATIONS

"U.S. Appl. No. 13/890,285, Non Final Office Action dated Sep. 25, 2013".
"U.S. Appl. No. 13/890,692, Non Final Office Action dated Sep. 10, 2013".
"U.S. Appl. No. 13/890,692, Notice of Allowance dated Dec. 18, 2013".
"U.S. Appl. No. 14/027,111, Non Final Office Action dated Deb. 14, 2014".
"U.S. Appl. No. 14/027,111, Notice of Allowance dated Jun. 6, 2014".
"U.S. Appl. No. 14/027,112, Non Final Office Action dated Sep. 4, 2014".
"U.S. Appl. No. 14/027,112, Notice of Allowance dated Oct. 27, 2014".
"U.S. Appl. No. 14/043,724, Non Final Office Action dated Dec. 26, 2014".
"U.S. Appl. No. 14/207,476, Non Final Office Action dated Jun. 13, 2014".
"U.S. Appl. No. 14/207,476, Notice of Allowance dated Jul. 22, 2014".
"U.S. Appl. No. 14/320,250, Non Final Office Action dated Nov. 28, 2014".
"International Application Serial No. PCT/US2010/059551, International Search Report dated Jun. 22, 2011", dated Jun. 22, 2011.
"International Application Serial No. PCT/US2010/059551, Written Opinion dated Jun. 22, 2011", dated Jun. 22, 2011.
"U.S. Appl. No. 13/300,344, Office Action dated Jun. 22, 2012", dated Jun. 12, 2012.
"U.S. Appl. No. 12/943,798, Office Action dated Sep. 6, 2011", dated Sep. 6, 2011.
"U.S. Appl. No. 12/943,789, Notice of Allowance dated Oct. 17, 2011", dated Oct. 17, 2011.
"U.S. Appl. No. 12/943,789, Office Action dated May 23, 2011", dated May 23, 2011.
"U.S. Appl. No. 12/943,792, Notice of Allowance dated Oct. 18, 2011", dated Oct. 18, 2011.
"U.S. Appl. No. 12/943,792, Office Action dated Jun. 15, 2011", dated Jun. 15, 2011.
"U.S. Appl. No. 12/943,797, Office Action dated Feb. 1, 2012", dated Feb. 1, 2012.
"U.S. Appl. No. 12/943,798, Final Office Action dated Jan. 31, 2012", dated Jan. 31, 2012.
"U.S. Appl. No. 12/943,798, Office Action dated Jun. 7, 2012", dated Jun. 7, 2012.
"U.S. Appl. No. 12/943,802, Final Office Action dated Oct. 26, 2011", dated Oct. 26, 2011.
"U.S. Appl. No. 12/943,802, Office Action dated Jul. 28, 2011", dated Jul. 28, 2011.
"U.S. Appl. No. 13/086,218, Office Action dated Jul. 31, 2012", dated Jul. 31, 2012.
"U.S. Appl. No. 13/294,064, Notice of Allowance dated Sep. 10, 2012", dated Sep. 10, 2012.
"U.S. Appl. No. 13/294,064, Office Action dated May 21, 2012", dated May 21, 2012.
"U.S. Appl. No. 13/300,344, Notice of Allowance dated Dec. 11, 2012", dated Dec. 11, 2012.

* cited by examiner

VIDEO PROCESSING AND SIGNAL ROUTING APPARATUS FOR PROVIDING PICTURE IN A PICTURE CAPABILITIES ON AN ELECTRONIC GAMING MACHINE

CROSS REFERENCE TO RELATED APPLICATIONS

This application claims priority under 35 U.S.C. § 120 and is a continuation of U.S. patent application Ser. No. 14/027,112. U.S. patent application Ser. No. 14/027,112 claims priority under 35 U.S.C. § 119(e) to U.S. Provisional Patent Application No. 61/708,519, filed Oct. 1, 2012, entitled "RADIO CANDLE MOUNT," by Paulsen et al, and U.S. Provisional Patent Application No. 61/801,122, filed Mar. 15, 2013, entitled "Methods and Apparatus for Retrofitting Gaming Machines," by Wells et al, each of which are incorporated by reference in their entirety and for all purposes. U.S. patent application Ser. No. 14/027,112 also claims priority under 35 U.S.C. § 120 and is a continuation-in-part of U.S. patent application Ser. No. 13/327,584, Candle Device for Generating Display Interfaces on the Main Display of a Gaming Machine," filed Dec. 15, 2011, by Wells, et al., which claims priority to U.S. patent application Ser. No. 12/943,789, titled, "Gaming Device and Method for Wireless Gaming System Providing Non-Intrusive Processes," by Wells, filed Nov. 10, 2010; which claims priority under 35 U.S.C. § 119(e) to U.S. Provisional Patent Application Ser. No. 61/303,106, entitled "Gaming Device and Method for Wireless Gaming System Providing Non-Intrusive Processes" by Wells, filed Feb. 10, 2010 each of which are incorporated by reference in their entirety and for all purposes.

BACKGROUND

Field of the Invention

The invention relates to gaming devices that provide communication capabilities and enhanced gaming functions on an electronic gaming machine.

Description of the Related Art

Casinos derive a large portion of their revenues from electronic gaming machines, including mechanical and video slot machines. The operating costs associated with maintaining electronic gaming machines is an important factor to casino operators. To maximize their profitability, casino operators wish to minimize the electronic gaming machine operating costs.

A significant component of the operating costs is related to the performance of maintenance operations requiring access to the interior of a gaming machine. For instance, access to the interior of the gaming machine is needed to periodically remove cash from the gaming machine, such as coins in a drop box or bills stored in a bill stacker. As another example, access to the interior of the gaming machine is needed to periodically replenish paper used to print ticket vouchers for cashless gaming applications.

For security and regulatory purposes, electronic gaming machines include a number of locked enclosures that are monitored by an internal security system. The locked enclosures and security system help to prevent unauthorized access to resources within the electronic gaming machine that may be targets of theft or tampering, such as deposited money or gaming software. To address a maintenance issue that requires access to interior portions of the gaming machine, often two or more keys carried by separate individuals can be required. During the performance of the maintenance operation in the interior, one individual not performing the maintenance may be required to watch the other individual performing the maintenance operation. Thus, a significant contributor to the gaming machine operating costs is labor costs associated with maintenance.

In addition to labor costs, while the gaming machine is being maintained it is not available for game play. Thus, revenue is lost which also contributes to the operating costs. Further, some maintenance operations, such as replenishing blank tickets that can be used to print redeemable ticket vouchers involve material costs. Thus, some maintenance operations contribute both material costs and labor costs to the gaming machine operating costs.

Balanced against minimizing operating costs are providing functions that make the machines more convenient for a player to use and encourage repeated use of the machines. For instance, a bill validator on a gaming machine is not required and its use increases gaming machine operating costs. However, the availability of a bill validator makes a gaming machine more convenient for a player to use which outweighs the additional operating costs associated with the bill validator. As another example, loyalty programs and associated hardware that allow for player rewards and a personalization of a gaming session increases operating costs. Nevertheless, it has been found that these features make a game play session more satisfying to players such that the average amount of game play or the amount of repeat business from a typical player is increased. The increase in game play or repeat business outweighs the operating costs associated with providing these features.

Thus, in view of the above, apparatus and method are desired that either reduce gaming machine operating costs or provide new features with benefits to players that outweigh the additional operation costs associated with providing the new features.

SUMMARY

Broadly speaking, the embodiments disclosed herein describe relate to providing enhanced gaming functionality to wagered-based gaming devices, such as but not limited to mechanical slot reel or video slot machines. In particular, the embodiments can be used on gaming devices that execute regulated gaming software to control a play of a wager-based game on the gaming device. In particular, a gaming system is configured to provide picture in a picture capabilities on a wager-based electronic gaming machine.

In one embodiment, the gaming system can include a first gaming device and a second gaming device where the first gaming device controls the second gaming device. The first gaming device can be configured to receive data and/or communicate with an electronic gaming machine controller, a value input device and value output device. The second gaming device can be configured to receive touchscreen data from a touchscreen display and first video data from the first gaming device and second video data from the EGM controller. Under control of the first gaming device, the first video data and second video data can be output in various sizes and locations on the touchscreen display.

In one aspect, the gaming system can include a first gaming device and a second gaming device which are each installed in a cabinet of the EGM. For example, the first gaming device and the second gaming device can be installed on the EGM in a retrofit after the EGM has been deployed and operating in a regulated gaming environment for some amount of time. The first gaming device can include a first housing and a first gaming device controller including a first processor and a first memory disposed within the first housing.

The first gaming device controller can be configured to, a) via a first data connector disposed within the first housing, transmit first video data and commands to the second gaming device and receive touch screen data from the second gaming device; b) via a second data connector disposed within the first housing, receive accounting data associated with a play of the wager-based game from an EGM controller disposed within an EGM cabinet of the EGM; c) via a third data connector disposed within the first housing, communicate with a value input device disposed within the EGM cabinet and communicatively coupled to the EGM controller; d) via a fourth data connector disposed within the first housing, communicate with a value input output device disposed within the EGM cabinet and communicatively coupled to the EGM controller; and e) via a network connector disposed within the first housing, communicate with one or more remote devices via the network connector. A power connector disposed within the first housing, can be configured to receive power from a power source within the EGM cabinet wherein the processor receives the power via the power connector.

The second gaming device can include a second housing and a second gaming device controller including a second processor and a second memory disposed within the second housing. The second gaming device controller can be configured to i) via a fifth data connector, disposed within the second housing, receive the touch screen data from the touch screen display; ii) via a sixth data connector, disposed within the second housing, send modified touch screen data to the EGM controller; iii) via a seventh data connector disposed within the second housing, receive second video data from the EGM controller associated with the play of the wager-based game; iv) via an eighth data connector disposed within the second housing, receive the commands and the first video data from the first gaming device; and v) via a ninth video connector disposed within the second housing, based upon the commands, output third video data to the touch screen display wherein the third video data includes portions of the first video data and the second video data.

In particular embodiments, the second gaming device controller can be configured to receive the second video data in a native resolution and based upon the commands received from the first gaming device controller, scale the second video data to a second resolution different from the native resolution and output the scaled second video data as part of the third video data. The second resolution can be less than the native resolution. The second gaming device controller can be configured to receive in the commands, a location on the touchscreen display to output the scaled second video data and generate the third video data such that the scaled second video data is output to the location. Further, the scaled second video data can output, as part of the third video data, on a portion of the touch screen video display where the second gaming device controller can be configured to determine a portion of the touch screen data which maps to the portion of the touch screen display, scale the portion of the touch screen data to the native resolution of the second video data and send the scaled portion of the touch screen data as the modified touch screen data.

Other aspects and advantages will become apparent from the following detailed description taken in conjunction with the accompanying drawings which illustrate, by way of example, the principles of the invention.

BRIEF DESCRIPTION OF THE DRAWINGS

The described embodiments will be readily understood by the following detailed description in conjunction with the accompanying drawings, wherein like reference numerals designate like structural elements, and in which.

DETAILED DESCRIPTION OF THE DESCRIBED EMBODIMENTS

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

A candle device is typically mounted to the top cabinet of a gaming machine for maximum visibility. It includes a number of stages of different colors that can be lit alone or in combination with other stages to convey information about a state of a gaming machine. For instance, often a candle device is configured to light up a stage of a particular color when an attendant is needed at the gaming machine. Traditional candle devices include a simple controller for turning on-off different lighting stages in response to commands from a game controller. In embodiments described herein, a wireless communication device can be provided in a mount for a candle device. In particular embodiments, the wireless communication device can provide wireless communications between the gaming machine and remote servers or wireless communications with portable electronic devices carried by casino employees and patrons alike.

With respect to FIGS. 1A, 1B, 1C, 1D and 2, method and apparatus for coupling a candle mount including a wireless communication interface to an electronic gaming machine (EGM) are described. In one embodiment, the wireless communication interface is coupled to a structure installed between a candle device and a cabinet of the EGM. The structure can provide a platform upon which the candle device is mounted to the EGM cabinet. The structure, also referred to as a radio candle mount can be installed during manufacture of the EGM or a part of a retrofit process of an existing EGM.

Figure 1A:
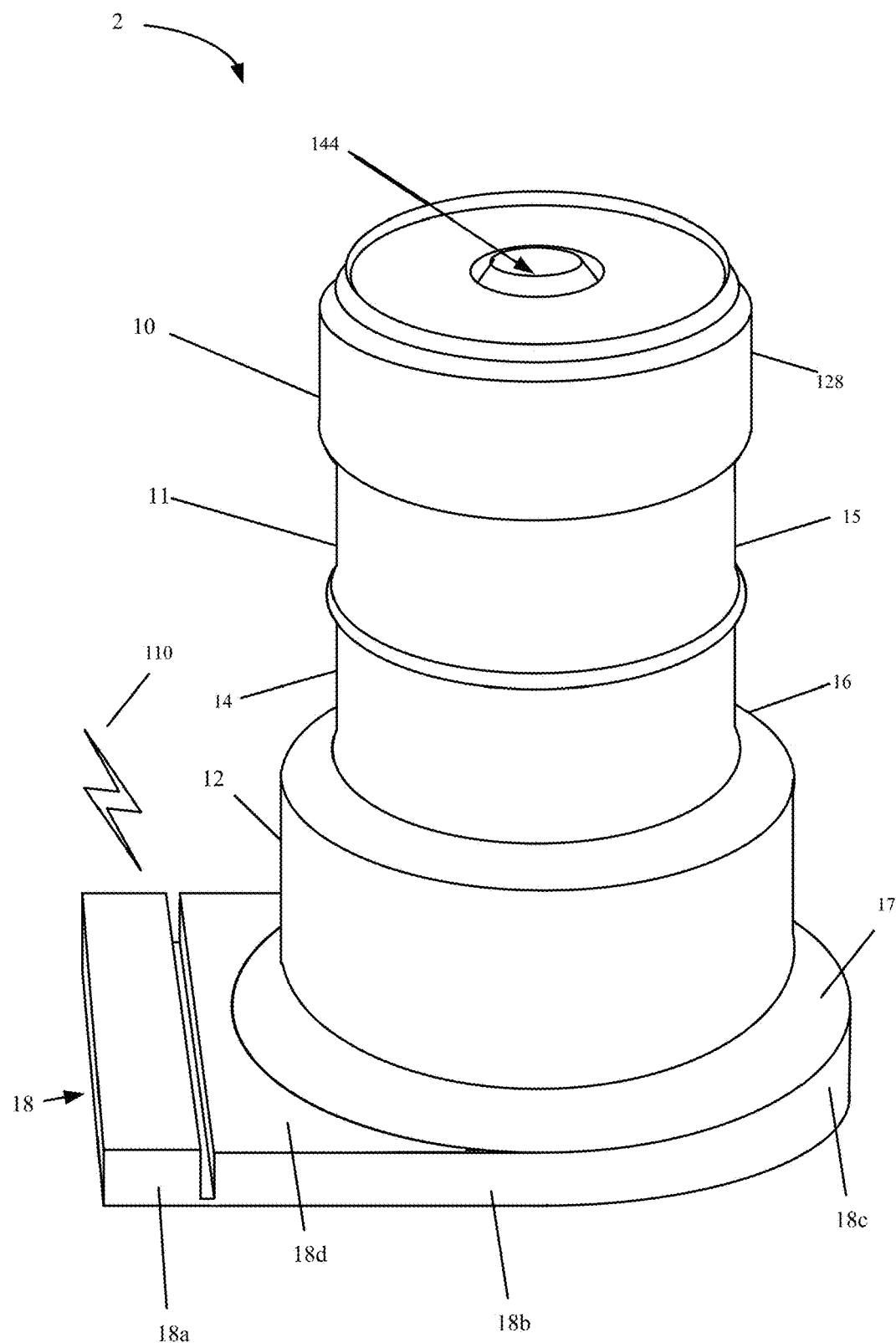
FIG. 1A is a perspective drawing of a candle device disposed on top of a radio candle mount in accordance with an embodiment.

In more detail, with respect to FIG. 1A, a candle device coupled to a radio candle mount is described. With respect to FIGS. 1B, 1C and 1D, details of the mechanical interfaces between a candle device, the radio candle mount and the EGM cabinet are discussed. A method of installing or retrofitting an EGM with a radio candle mount is described in FIG. 2. In regards to FIGS. 3-6, two types of secondary gaming devices which can be coupled to an EGM to utilize the wireless capabilities provided by the radio candle mount and other enhanced gaming services are discussed.

Figure 7:
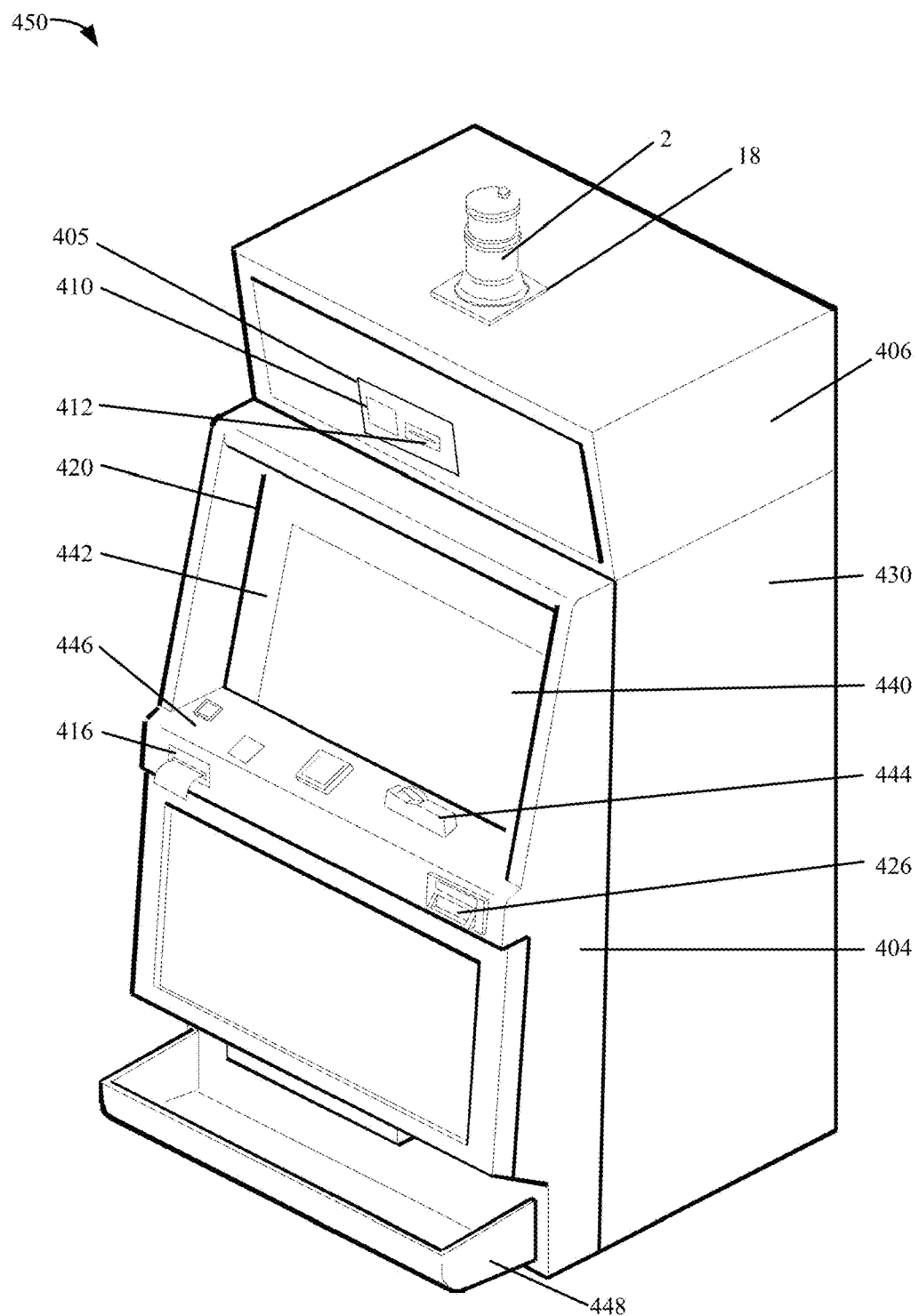
FIG. 7 is a perspective drawing showing exterior portions of an electronic gaming machine in accordance with the described embodiments.
Figure 8:
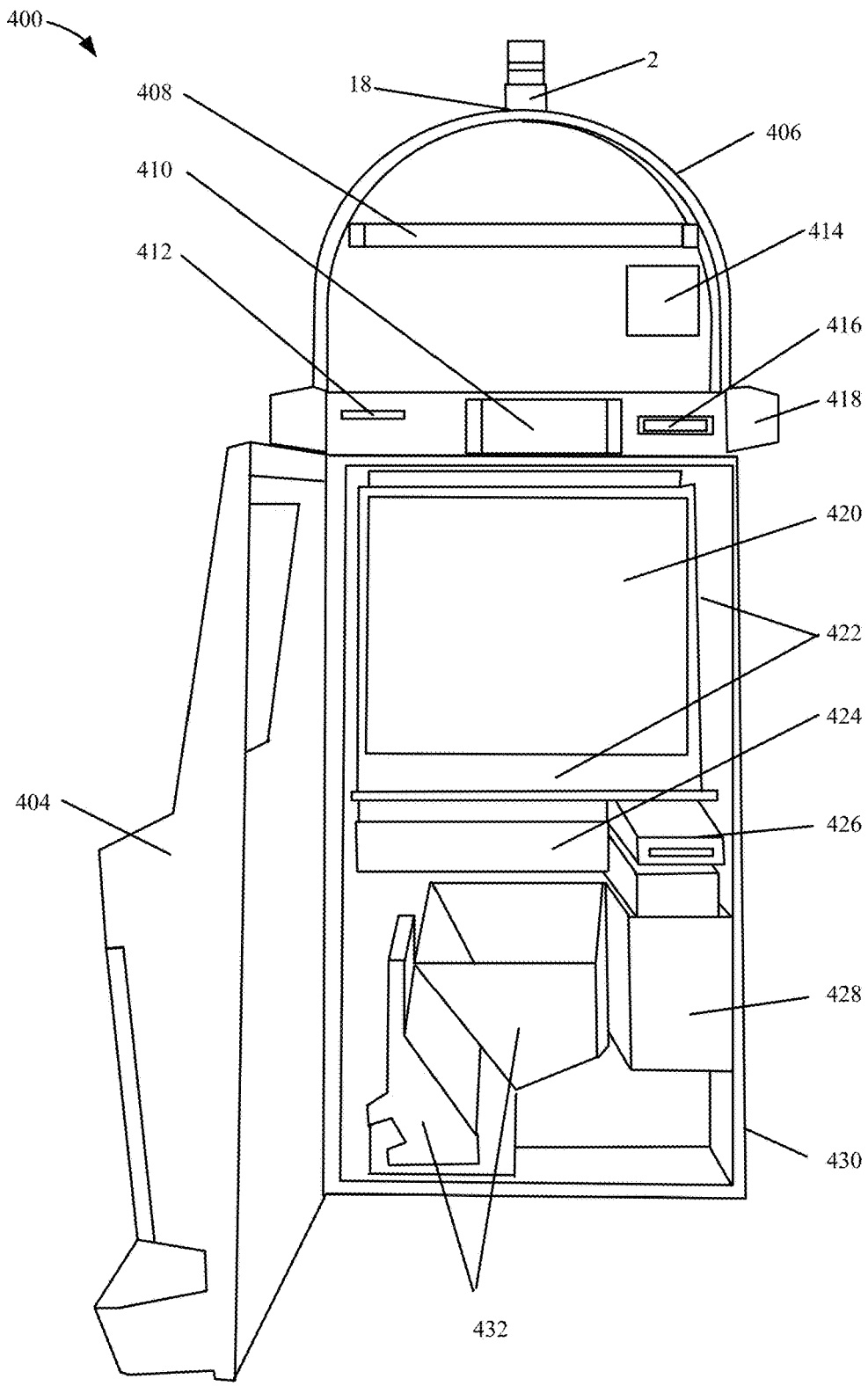
FIG. 8 is a perspective drawing showing exterior and interior portions of an electronic gaming machine in accordance with the described embodiments.

With respect to FIGS. 7 and 8, an exterior and interior views of an EGM with a radio candle mount and one or more of an externally or internally disposed secondary gaming devices coupled to the radio candle mount is described. The secondary gaming devices can be configured to provide enhanced gaming services via the radio candle mount. One connection scheme between an EGM, secondary gaming device and radio candle mount is described with respect to FIG. 9. The operation of an EGM with the secondary devices and radio candle mount are also discussed with respect to FIGS. 7, 8 and 9. With respect to FIGS. 10 and 11, a gaming system including EGM's with the secondary gaming devices and one or more radio candle mounts are discussed. In one embodiment, the gaming system can include secondary devices which allow a touch screen video display to be used as an interface for providing enhanced gaming services.

Radio Candle Mount

In this section, a method and apparatus for providing a wireless communication interface on an EGM are described. In one embodiment, the wireless communication interface can be incorporated into a radio candle mount. The radio candle mount 18 can be used to provide a mounting surface for the candle device 2. The candle device 2 and radio candle mount 18 can be secured to the EGM cabinet. The radio candle mount 18 can include a wireless communication interface, such as a radio. The EGM cabinet can include a hole which allows wires associated with the candle device 2 and radio candle mount 18 to be passed into an interior of the EGM and coupled to devices located within the EGM cabinet.

FIG. 1A is a perspective drawing of a candle device 2 disposed on top of a radio candle mount 18 in accordance with an embodiment. The candle device 2 can provide lighting capabilities for indicating a status of an EGM. In addition, as is described below with respect to FIGS. 3, 4 and 6, the candle device 2 can be configured to provide additional functions to an EGM and in more detail with respect to U.S. patent application Ser. No. 13/327,584 and its parent application previously incorporated by reference.

A candle device, such as candle device 2, can have many different form factors. The candle device 2 can include an upper housing 10 that fits over a clear shell 11 that forms a middle portion of the housing. In one embodiment, the shell 11 can be cylindrical but other shapes are possible and the example of a cylinder is provided for illustrative purposes only. The shell 11 can be formed from a light transmitting material, such that light emitted from lighting elements (e.g., LEDs) disposed within the housing can be transmitted through the shell 11 when the lights are activated. The shell 11 can fit into a base 12, which can serve as a lower portion of the housing.

In a particular embodiment, the upper housing 10, shell 11 and base 12 can be formed from a polycarbonate plastic. The upper housing 10 and base 12 can be metalized to provide a metal sheen if desired. In other embodiments, an opaque coating can be provided on portions of the housing, such as the upper housing 10 and the base 12. One or more divider rings, such as 14, can be placed over the cylindrical shell 11 to divide the shell into a number of stages, such as stages 15 and 16.

Each of the stages 15 and 16 can include lighting elements that are separately controlled. In one embodiment, the lighting elements can be used to provide candle functions, i.e., to convey information about the gaming machine to which it is coupled. For instance, stage 15 can be lit, stage 16 can be lit or both stage 15 and 16 can be simultaneously lit to convey information about the status of the gaming machine. If more than two stages are used, then additional combinations of lit stages are available to convey gaming machine status information.

In particular embodiments, the candle 2, depending on the number of stages, can be from 5.5 inches to 7.5 inches in height. For instance, a device with two stages can be about 5.5 inches in height, a device with three stages can be about 6.5 inches in height and a device with four stages can be about 7.5 inches in height. The lighting elements in each stage can be independently controlled so each stage can be lit by itself or in combination with other stages. When the candle is coupled to an electronic gaming machine via a candle mount 18, the combinations of lit stages can be used to convey information associated with the electronic gaming machine, such as a need for service.

The diameter of the shell 11 can be about 2 inches. The outer diameter of the upper housing 10 can be greater to or equal to the diameter of shell 11, such as between 2 and 3 inches. The outer diameter of the base 12 can vary from about 2 inches to 3 inches. In particular embodiments, the base can be about 1 inch in height. The height of the upper housing 10 can be from about 0.5 to 4 inches. In a particular embodiment, the height can be about 2.25 inches. In some embodiments, the dimensions of the candle 2 can be selected to conform to dimensions proscribed by regulations of a specific gaming jurisdiction. For instance, the regulations can specify a required height for a candle device.

The candle base 12 can include a mounting plate 20 (FIG. 2) that allows the candle 2 to be secured to a gaming machine via a candle mount 18 with wireless communication capabilities. The candle base 12 circular cross section. In other embodiments, the candle base can be rectangular shaped or a general polygon. In one embodiment, the candle mount 18 can be sized such that the candle base 12 doesn't overhang beyond the top surface of the candle mount 18. In other embodiments, a portion of the candle base 12 can overhang the top surface of the candle mount.

In one embodiment, a portion 18c of the candle mount conforms to portion of the outer edge 17 of the candle base 12. The outer perimeter of the candle mount 18 does not have to conform to the outer edge of the candle base. For example, the candle base 12 can be rectangularly shaped with a length and width that are greater than a maximum diameter of the candle base 12. As another example, the radius of the circular portion 18c can be greater than the maximum radius associated with base 12 such that portions of the top surface 18d of candle mount 18 are visible around the outer edge of the candle base 12 or the radius can be smaller than the maximum radius such that the base overhangs a top surface 18d of the candle mount 18, In one embodiment, the radio candle mount 18 can include two portions: a radio portion 18a and a platform portion 18b, which are described in more detail below. The housing of the candle mount 18 can be injection molded plastic in one embodiment. According to another embodiment, the housing of the platform portion 18b can be formed of metal, such as sheet metal, while the housing of the radio portion 18a is formed of a radio transparent material, such as plastic or ceramic.

In the embodiment shown in FIG. 1A, the radio portion 18a and the platform portion 18b can be formed as an integral part. According to another embodiment, the radio portion 18a and the platform portion 18b are formed as separate parts that can either remain separate or can be attached to one another. When formed as separate parts, it may be possible to install the radio candle mount as part of a retrofit process where disconnecting the candle 12 is not required.

The radio portion 18a can include a wireless communication radio device and one or more antennas for wireless communication involving one or more different wireless communication protocols. The radio device and the antenna(s) can be enclosed within a housing. The antenna(s) can be used to transmit and receive wireless signals 110. In general, one or more antennas can be provided at different locations within the candle mount 18. The antenna(s) can be provided for communicating with mobile devices and/or remote servers, such as for communicating via Bluetooth™, Wi-Fi™ or WiMAX related communication protocols.

In the example of FIG. 1A, a top of the radio portion 18a is shown as being level with the top of surface 18d of the other section. In other embodiments, the top of the radio portion can be at a different height and at a different orientation. Further, the radio portion 18a is shown as rectangularly shaped, but is not limited to this shaped. In one embodiment, the section 18b for receiving the base can include a recessed portion for receiving the candle base 12. Thus, the candle base 12 may rest on a portion with a level which is lower than the level of top surface 18d. In additional embodiments, the radio portion 18a can be sealed such that the antennas and communications components are not accessible without destroying the housing associated with the radio portion 18a. The radio portion 18a can include security mechanisms for detecting whether the radio portion 18a has been accessed or modified in some manner.

Figure 1B:
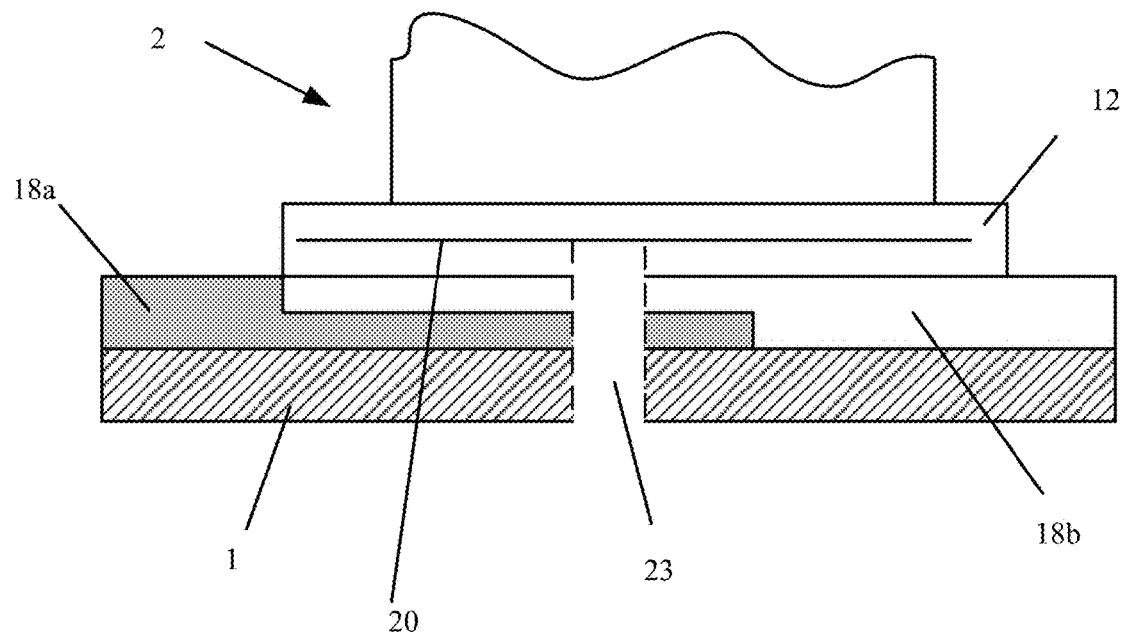
FIG. 1B is a side cross-sectional view of a radio candle mount in accordance with an embodiment.

FIG. 1B is a side cross-sectional view of an embodiment of the candle mount 18. In some embodiments, the radio portion 18a and the platform portion 18b can be snapped or locked into place with one another. In one embodiment, a horseshoe or U-shaped platform portion 18b and a horseshoe-shaped radio portion 18a can overlap such that the mounting screws (not shown) can pass through as screw hole 23 in the platform portion 18b, the radio portion 18a, and the base 12 of the candle 2 to the mounting plate 20, as shown in FIG. 1B. Once in place, the mounting screws can secure the candle to the platform and prevent the sections, 18a and 18b, from being separated from one another. Multiple screw holes, such as 23, and mounting screws can be utilized to secure the device and the example in FIG. 1B is provided for purposes of illustration only (e.g., see FIGS. 1C and 1D).

The candle mount 18 (and candle device 2) can be secured to a surface, such as an exterior surface of a gaming cabinet of a gaming machine 1. Traditionally, a candle 2 can be mounted to the top of the gaming machine cabinet 1 to increase its visibility. According to an embodiment shown in FIG. 1C, an aperture 22 in the platform portion 18b and in the cabinet of the gaming machine 1 can allow a wiring bundle, including power and/or data connections for the candle 2, such as a wiring bundle 121 extended from base 12, to be passed through the platform portion 18b and an exterior surface of the gaming machine cabinet 1 and into the interior of the gaming machine cabinet 1.

Figure 4:
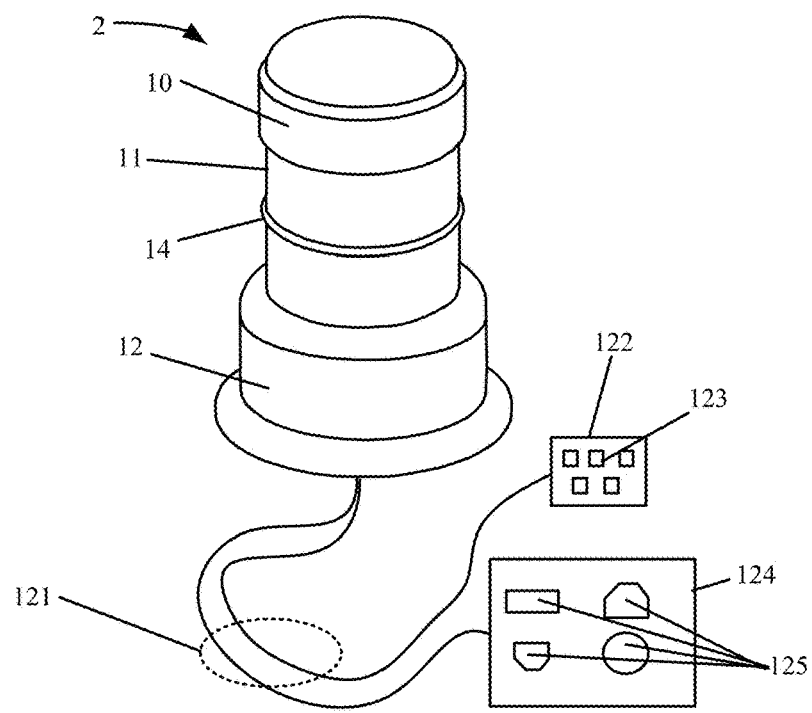
FIG. 4 is a perspective drawing of a candle device including a wiring harness in accordance with the described embodiments.

As shown in FIG. 4, a wiring bundle 121 can extend from the base 12. This wiring bundle 121 can then be passed through the candle mount 18. Wiring 131 from the radio on the radio portion 18b can also be passed through the platform portion 18b and into the interior of the cabinet of the gaming machine 1. According to another embodiment shown in FIG. 1D, the platform portion 18b can be horseshoe or U-shaped such that the wiring bundle 121 from the candle device 2 and the wiring 131 from the radio can pass through the open end of the horseshoe to the cabinet of the gaming machine 1.

Figure 2:
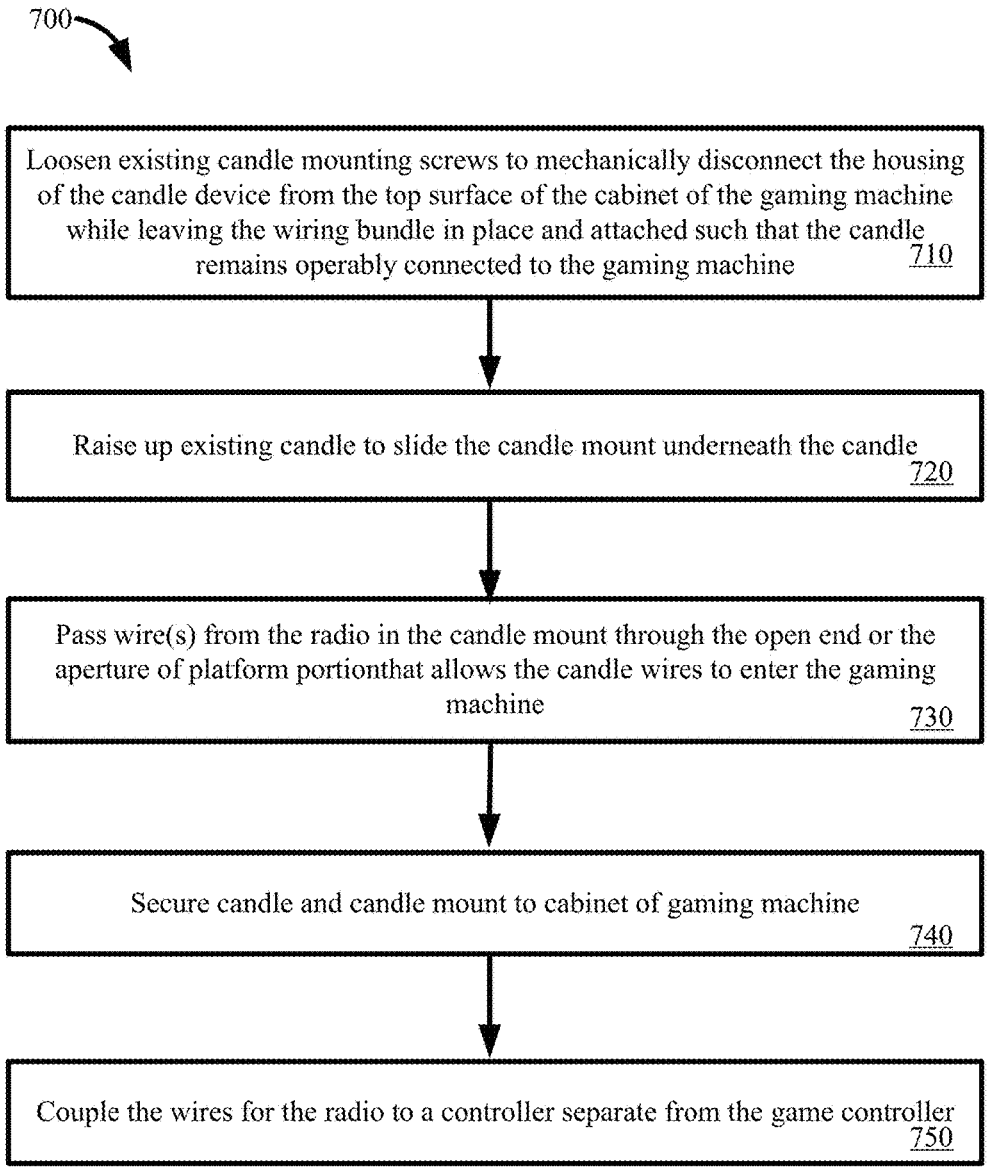
FIG. 2 is a flow chart of a method of retrofitting an electronic gaming machine with a wireless communication device.

As described in more detail with reference to FIG. 2, an existing electronic gaming machine with a candle device can be retrofitted with a wireless communication device. According to this embodiment, existing candle mounting screws can be loosened to remove the housing of the candle device 2 from the top surface of the cabinet of the gaming machine 1 while leaving the wiring bundle 121 in place such that the candle 2 remains operably connected to the gaming machine 1. A first platform portion 18b can be slid under the candle 2 and around the existing candle wires 121 without having to disconnect them and thread them through the aperture 22 in the cabinet of the gaming machine 1, thereby saving substantial installation time and eliminating potential damage to the existing connections from undoing and then reconnecting them. The wire 131 from the radio can also be passed through the open end of the horseshoe-shaped platform portion 18b, and the radio portion 18a and the platform portion 18b can fit together so that the horseshoe is closed. The two pieces can fit together in any suitable manner, such as snapping or other locking together.

The mounting plate 20 within the candle base 12 can allow the mounting screws to be tightened from inside the cabinet of the gaming machine 1 to secure the candle 2 to the gaming machine 1. According to another embodiment, the holes 23 that receive the mounting screws to secure the candle 2 pass all the way through the base 12 such that the mounting screws can be tightened externally from the top surface of the candle base 12.

The candle mount 18 can include apertures which align with the positions of the existing mounting screws associated with the candle base 12. In one embodiment, the candle mount can include apertures at different positions to accommodate different candle designs where only a portion of the apertures are utilized for a particular candle designs. For example, a first candle design can utilize one or more mounting screws in first positions and a second candle design can utilize one or more mounting screws in second positions where candle mount can include apertures which accommodate the mounting screws with either design.

Figure 1C:
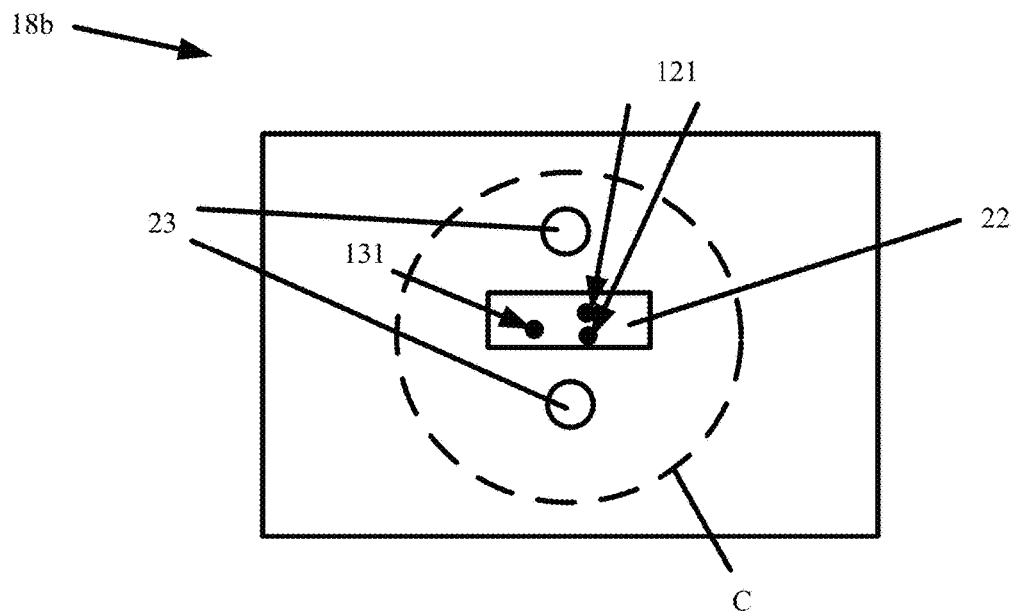
FIG. 1C is a top view of a platform portion of a candle mount in accordance with an embodiment.
Figure 1D:
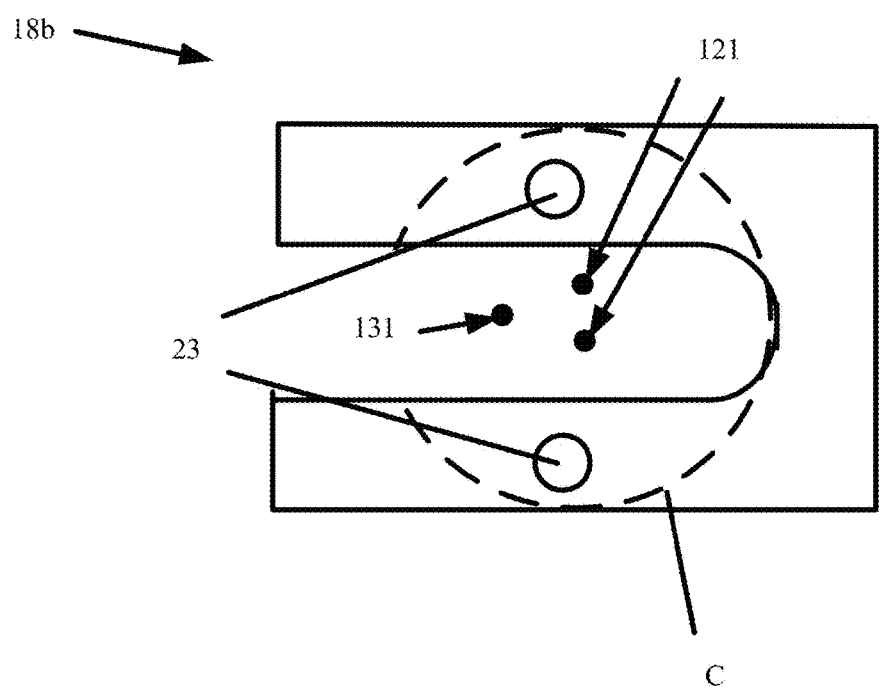
FIG. 1D is a top view of a platform portion of a candle mount in accordance with another embodiment.

The candle mount 18 can be made for a candle having a base of any shape. As shown in the embodiments of FIGS. 1C and 1D, the top surface of the candle mount 18 is configured for receiving a candle device 2 having a round base as depicted by circle C. However, in other embodiments, the top surface of the candle mount 18 can be configured for receiving a candle device 2 having a square base. In another example, the base can be rectangular or have an irregular shaped base.

Methods of Installing a Radio Candle Mount

As noted above, an existing electronic gaming machine with a candle device can be retrofitted with a wireless communication device. FIG. 2 is a flow chart of a method 600 of retrofitting an electronic gaming machine with a wireless communication device. According to this embodiment, in 610, existing candle mounting screws can be loosened to mechanically disconnect the housing of the candle device from the top surface of the cabinet of the gaming machine while leaving the wiring bundle in place and attached such that the candle remains operably connected to the gaming machine. The existing candle can then be raised up to slide the candle mount underneath the candle in 620. In one embodiment, the candle amount can be formed in two or more sections. For example as described above, horseshoe-shaped platform portion can be slid under the candle and around the existing candle wires without having to disconnect them and thread them through the aperture in the cabinet of the EGM, thereby saving substantial installation time and eliminating potential damage to the existing connections from undoing and then reconnecting them.

According to another embodiment, the platform is integrally formed or manufactured as a single piece for installation with an aperture which allows the wiring harness from the candle to pass through. Thus, the platform portion of the candle mount does not have an open end but instead has an aperture through which the wiring bundle can pass. In this embodiment, the wires from the candle to the electronic gaming machine would have to be disconnected in order to thread the wiring bundle through the aperture in the candle mount when an EGM with an installed candle is being modified. In the case of a new gaming machine, the wiring bundle for the candle can be threaded through the aperture before the candle device is coupled to the EGM.

In 630, the wire(s) from the radio in the candle mount can be passed through the open end or the aperture that allows the candle wires to enter the gaming machine. In an embodiment with a horseshoe-shaped platform portion, the radio portion and the platform portion of the candle mount can be fit together so that the horseshoe is closed. The two pieces can fit together in any suitable manner, such as snapping or other locking together and are not limited to being horseshoe-shaped. In addition, more than two pieces can be used.

In 640, the candle with the mount sandwiched underneath the candle can be secured to the cabinet of the gaming machine. In one embodiment, one or more fasteners associated with the candle device can be passed through the candle mount. The fasteners can be configured to be secured from an interior of the EGM, such that access to the interior of the EGM is normally required to release the fasteners. In another embodiments, one or more fasteners may be used which can be adjusted from an exterior of the EGM.

In 650, the wires from the radio can be used to establish a communication pathway to a controller. The controller may be an EGM controller used to generate a game on the EGM or may be a controller associated with a secondary device, such one of the devices described with respect to FIGS. 3, 4 and 5 or a player tracking controller (not shown). In one embodiment, the radio candle mount can be configured to connect to multiple controllers on separate devices. The controller on controllers can use the radio (or radios) to communicate with remote devices, such as a remote server.

Secondary Gaming Devices with Wireless Communication Capabilities

In this section, two secondary gaming devices are described which can be configured to provide wireless communications via the radio candle mount. In various embodiments, the secondary devices can be mounted to and extend from the EGM cabinet such that a portion of the secondary device is visible. For example, a candle device configured to provide wireless communications via the radio in the radio candle mount is described as follows with respect to FIGS. 3 and 4. In another embodiment, a secondary gaming device configured for installation within an interior cabinet of the EGM is described with respect to FIG. 4.

Figure 3:
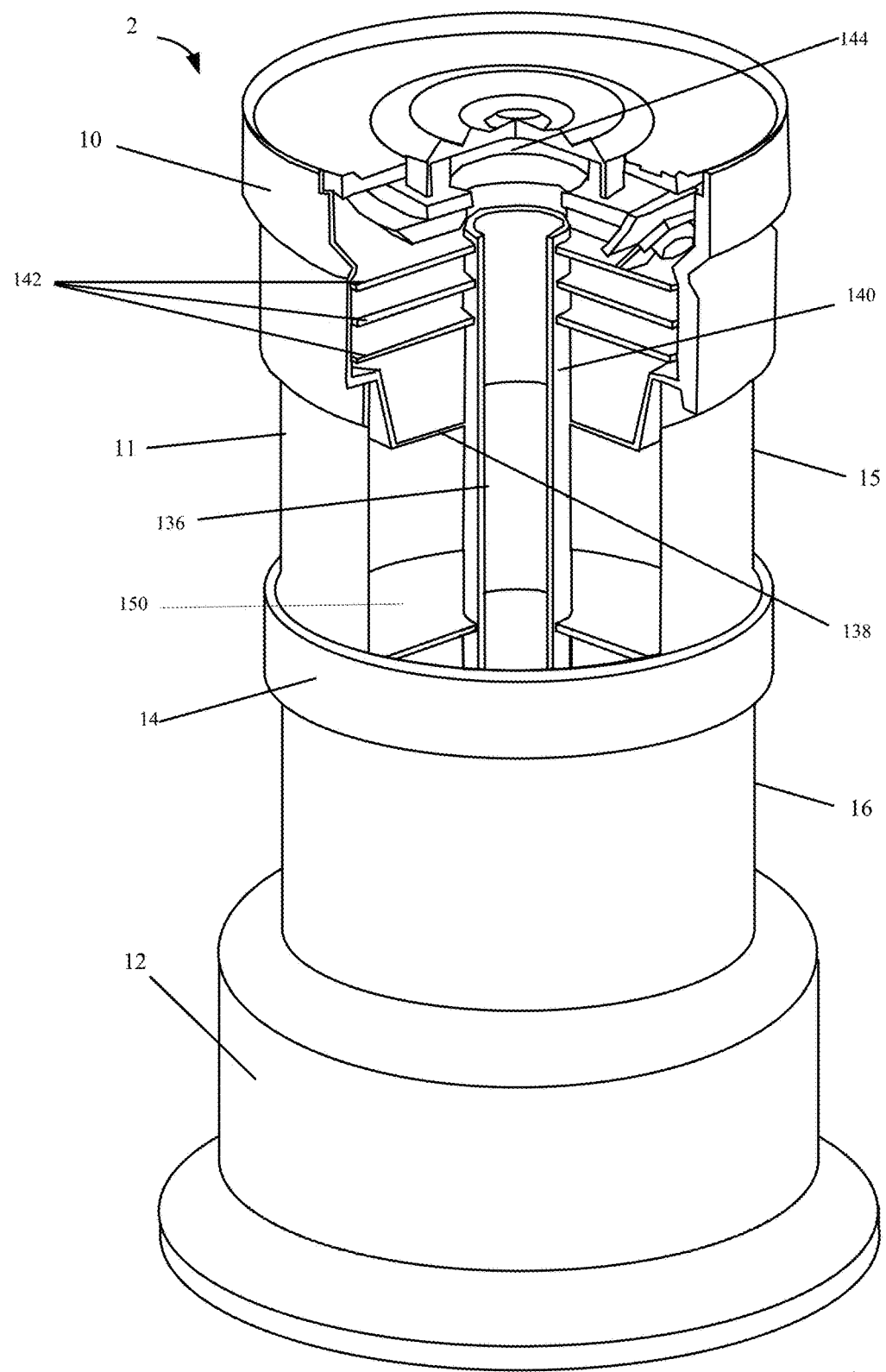
FIG. 3 is a perspective drawing of a candle device including an internal cross section in accordance with the described embodiments.

FIG. 3 is a perspective drawing of a candle 2 including a partial cut-away of a top portion of the housing 10. As described with respect to FIG. 1, the candle 2 includes two stages, 15 and 16, separated by the divider 14. In one embodiment, the candle controller includes 3 PCBs 142, disposed in different horizontal planes. In other embodiments, the candle controller can include one or more PCBs. When multiple PCBs are utilized, one or more connectors between the PCBs can be used to transfer data between the boards. The PCBs can include one or more processors and memory which are used to execute programs for generating additional services on an EGM.

The upper housing 10 includes a bottom portion 138. The bottom portion includes an aperture that allows a center conduit 136 to extend through the bottom portion 138 and into an interior portion of the upper housing 10. The bottom portion 138 separates the enclosure from the two lighting stages 15 and 16 disposed beneath the enclosure. The central conduit can be anchored to the base 12 of the candle 12.

In one embodiment, the one or more PCBs, such as 142, can be coupled to an outer surface 140 of the central conduit 136. For instance, the PCBs can be glued to the outer surface 140. In addition, the one or more PCBs can also be coupled to upper housing 10. In this configuration, an attempt to move the upper housing 10 relative to the central conduit 136, such via twisting or pulling the upper housing 10, can damage the one or more PCBs and possibly render the circuitry on the one or more PCBs non-functional. When the one or more PCBs are coupled to the central conduit 136, a sensor can be provided for detecting stresses in the central conduit. Thus, stresses resulting from attempts to twist or pull the upper housing 10 the upper housing relative to the central conduit. The sensor can be used to trigger an alarm with a stress above a certain threshold is detected. In general, the candle device can include one or more sensors for detecting tampering with the candle device.

Power and data connections can run through the center conduit from the housing 10 such that connections are formed with the one or more PCBs in the housing. The power connection can be used to supply power to a candle controller. The data connections can allow for bi-directional communication between the candle controller and one or more devices coupled to an EGM, such as value input devices, value output devices, displays, etc. or remote devices, such as one or more servers. One of the data connections can allow the candle to send and receive data from the wireless communication interface associated with the radio candle mount. Further, the data connections can allow for bi-directional communications between peripheral devices disposed in different portions of the candle 2, such as lighting elements in each of the stages 15 and 16 and peripheral devices located in the base 12.

The central conduit 136 can include apertures that allow power and/or data connections to extend through the side of the conduit. For instance, an aperture can be provide in the central conduit at each of the stages 15 and 16 to allow power and data connections to extend from the conduit 136 to peripheral devices located in each stage, such as the lighting elements located in each stage. In addition, the power and data connections routed through the center conduit 136 can be connected to a wiring harness that extends from the base 12.

The end of the wiring harness can include one or more connection interfaces. The one or more connection interfaces can couple the candle to an external power source and external communication links. The communication links can allow the controller to communicate with and receive data from devices, such as a game controller, a value input device or a value output device disposed within a gaming machine cabinet to which the candle device 2 is mounted. Details of the wiring harness are discussed below with respect to FIG. 4. A traditional candle device may have fewer capabilities and a simpler wiring harness and connectors. For example, most traditional candles aren't configured for wireless communications or interacting with devices other than a game controller on the EGM.

Each lighting stage, such as stages 15 and 16, can include a number of lighting elements. The lighting elements in each stage can be enclosed to prevent light from lighting elements from one stage from bleeding into another stage. For example, the divider 150 can be composed of an opaque material that prevents light from stage 15 from bleeding into stage 16 when the lighting elements in stage 15 are activated. In some embodiments, each stage can include lighting elements of different colors where each of the colored lighting elements can be activated alone or in combination with lighting elements of different colors to change the color of each stage. The colors of each stage used in a candle 2 can vary from jurisdiction to jurisdiction. Thus, a candle with stages configurable with different colors can allow the candle to be used in multiple jurisdictions.

In one embodiment, a speaker assembly 144 can be mounted to the housing 10. The speaker assembly 144 can provide sound generation capabilities for the candle device 2. In the example shown in FIG. 3, the speaker assembly 144 forms a top portion of the upper housing 10 and part of a secure enclosure for the candle controller. In alternate embodiments, a speaker assembly, such as 144, can be located in an interior portion of the candle device 2 where it is mounted in proximity of an inner surface of the housing for the candle device 2. The inner surface of the housing can include apertures that allow sound emitted from the speaker assembly to be transmitted through the housing. For instance, a cap with apertures can be placed over the speaker assembly 144. In various embodiments, the candle device 2 can be provided without a sound generation device or can be provided with multiple sound generation devices.

In some embodiments, the candle device 2 can be coupled to a remote image capture device. For instance, image capture device can be mounted to a player tracking unit installed within a gaming machine cabinet, a card reader installed within the gaming machine cabinet or at some other location on the gaming machine cabinet, such as within a top box. A wired or wireless communication connection can be implemented between a controller within the candle device 2 and the image capture device. Next details of the candle wiring harness are described.

FIG. 4 is a perspective drawing of a candle 2 including a wiring harness 121. The wiring harness 121 can extend from the base 12 and through the candle mount 18. As shown in FIG. 4, the wiring harness can include a number of wires coupled to connectors, such as 122 and 124. The connectors can include data and/or power interfaces, such as 123 and 125. Via the data and/or power interfaces, a candle controller, lighting elements and other peripheral device disposed within the interior of the candle 2 can receive power and send and/or receive data.

In one embodiment, the candle 2 can be configured to receive external power and then condition the received power. The conditioned power can then be output and received by another device via one of the connectors. For instance, a powered USB interface can be provided on one of the connectors 122 and 124. The power conditions functions can also be provided by the secondary gaming device 200 described below with respect to FIG. 4.

Figure 5:
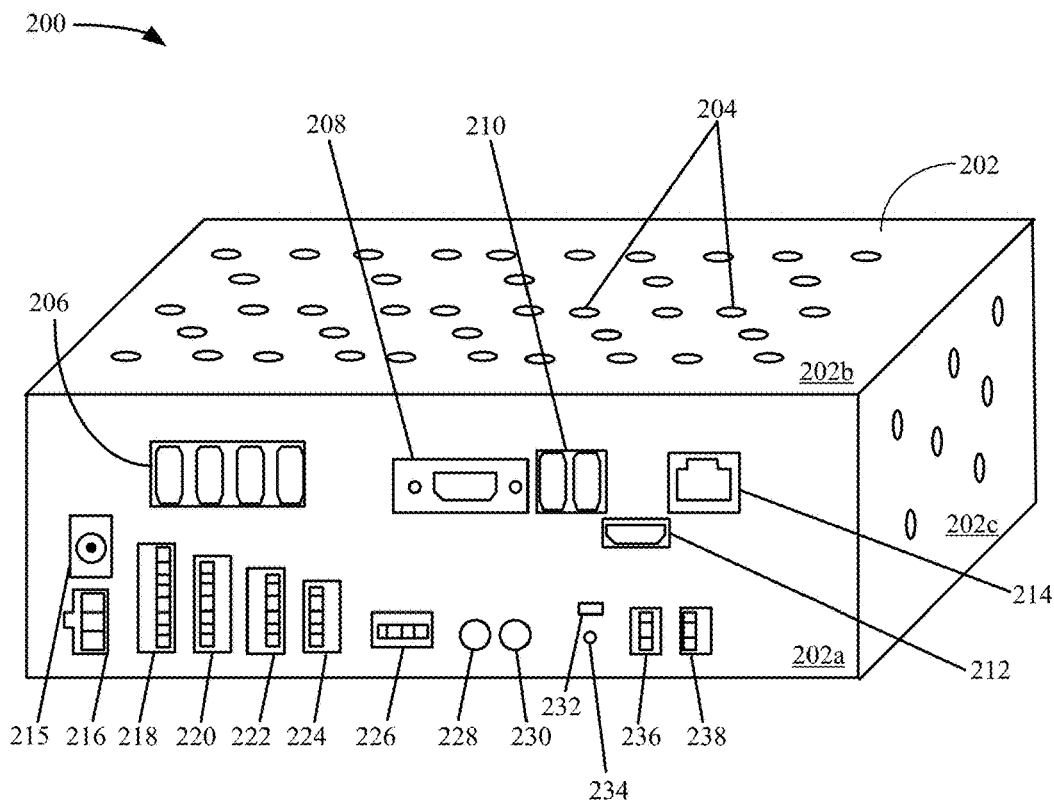
FIG. 5 is a perspective drawing of a secondary gaming device including numerous power and communication interfaces in accordance with the described embodiments.

In various embodiments, all or a portion of the functions described with respect to candle device 2 can also be provided by the secondary gaming device 200 which is configured for internal installation within the gaming machine cabinet (see FIG. 5). Because of the candle device's form factor, the candle device 2 may utilize less common parts, such as circular PCBs. The secondary device 200, unconstrained by the candle device's form factor, as it is mounted within the interior of the EGM, allows it to use more standard parts, such as rectangular PCB board.

In a particular embodiment, the wiring harnesses can include a primary connector 122 and a secondary connector 124. The primary connector 122 can be used to connect a legacy power and data connections on a gaming machine. It is shown as a single component but can comprise multiple components. The legacy power and data connectors can vary from gaming machine to gaming machine and the primary connector 122 can take different forms to allow for compatibility with different gaming machines. As an example, the primary connector 122 includes five apertures 123 for compatibility with legacy communication and data connections on different gaming machines. The compatibly provided by the legacy power and data connectors can allow an existing candle device on a gaming machine to be replaced with the candle device 2.

The secondary connectors 124 can be used to add new data and power connections on a gaming machine and to reconfigure existing data and power connections on a gaming machine. The secondary connector 124 can include power and/or data interfaces, such as but not limited to four different communication and/or data connections 125. The form factor of the secondary connectors including the number and types of connections that can provided can be varied and are provided for the purposes of illustration only. Examples of power and/or data connections that may be included in a secondary connector include but are not limited to USB, DVI, HDMI, Ethernet, an audio jack, composite video, fiber optic, RS-232, RS-422, RS-485, component video, VGA, RGB, digital audio, IEEE-1394, IEC, PS/2, PCI express, PCI, PCI-X, RJ45, RJ11, ATA, SCART and S-Video. One configuration of secondary connectors compatible with many types of EGMs is described below with respect to FIG. 5.

In one embodiment, the candle 2 can include a power switching device 150. The power switching device 150 can be configured to allow power to be cut and then restored for one or more gaming devices on the gaming machine. In one embodiment, the candle device 2 can be configured to cycle power for the entire gaming machine. The power cycling can be implemented in response to a command received from an external device. The commands can be encrypted and other protocols can be used to prevent an unauthorized person from sending the command to the candle device 2. In one embodiment, a mobile application can be configured to generate an authorization message to begin the power cycling on the gaming machine via the candle device 2.

FIG. 5 is a perspective drawing of a secondary gaming device 200 including numerous power and communication interfaces in accordance with the described embodiments. The secondary gaming device includes a housing 202. In one embodiment, the housing 202 is box shaped with six planar sides. The housing 202 can be other shapes and the example of a box is provided for the purposes of illustration only.

In one embodiment, the length, width and height dimensions of the housing 202 can be about 8 inches (L) by 3.5 inches (W) by 2.5 inches (H) for a volume of 70 cubic inches. An internal volume of 100 cubic inches or less provides adequate area for the power and data connectors and volume for the internal circuitry coupled to the connectors including a processor and memory. The volume allows for the housing 200 to fit in the excess space in the interior cabinet of a variety of different types of EGMs (e.g., FIG. 8 shows an interior of an EGM). In a retrofit installation, the excess space can be a location within the EGM cabinet not occupied by the existing EGM components at the time of installation of device 200. The location and the orientation in which the secondary gaming device 200 is installed in the EGM can vary from EGM to EGM depending on the internal configuration of the EGM.

In one embodiment, all of the power and data connectors can be located on one planar surface of the housing. For example, the housing 202 is box-shaped and all of the connectors are located on surface 202a. Thus, no connectors are located on the side opposite 202a, side 202b and its opposite side and side 202c and its opposite side. This feature can simplify the installation process as all the power connectors are accessible and visible at the same time which can be important when installing the device 200 in a cramped interior of an EGM cabinet. In another embodiment, the power and data connectors can be distributed across only two surfaces, such as surface 202a and 202c for example or between surface 202a and its opposite side.

One advantage of locating the power and data connectors on only one or only two surfaces of the housing is that it allows the housing to be mounted in a variety of orientations. For example, for housing 202, one or more of the remaining sides can be used for mounting purposes. For example, an attachment interface can be placed on any of sides 202b and its opposite, 202c and its opposite and 202a and its opposite. The orientation of the device 200 in an installed position can depend on the orientation of one or more surfaces in an interior of an EGM to which one or more sides of device 200 are coupled. For example, the device 200 can be mounted to a horizontal surface, a vertical surface, a combination of both a horizontal and a vertical surfaces or a slanted surface).

In one embodiment, a Velcro-type interface, such as Velcro-type tape with two adhesive sides, can be used to couple one or more sides of housing 202 to one or more surfaces within an EGM cabinet, such an interior surface of the cabinet or a surface associated with some other device within the EGM cabinet. In another embodiment, another type of fastener, such a mounting bracket can be used. With a Velcro-type interface, gaming device 200 can be easily swapped with another device if the device is faulty or needs to be upgraded.

The housing 200 can enclose the connectors, processors and memories. The components, such as the processors can generate heat. The housing 200 can include a number of vents, such as a grill of small holes 204, for cooling purposes. A cooling device, such as a fan may be located within the housing or coupled to an exterior portion of the housing. In another embodiment, the housing can be sealed and cooling mechanisms can be placed on the outside and/or inside of the housing, such as heat sinks with radiators or water cooled systems. Sealing the housing can protect the electronic components from dust and/other contaminants which can cause shorts and limit access to the interior housing, which may be beneficial for security purposes. When vents, such as 204 are used, the vents can be covered with a grill or a mesh to prevent dust intrusion.

In one embodiment, the housing 200 can be formed from two or more pieces. The pieces can be configured lock or snap together or be secured to one another via some other type of fastener. Security sensors can be placed within the housing 200. The security sensors can be configured to detect an access to an interior housing and/or manipulation of any of the internal components, such as a processor and/or memory disposed within the housing 200. A processor associated with the secondary device can monitor the security sensors. In addition, the processor can be configured to monitor security sensors or receive security related data associated with the EGM as is described as follows with respect to FIG. 6.

The housing 200 can include a number of apertures for power and data connectors. When device 200 is installed in an EGM, such as during a retrofit, new power and data pathways may be established between the device 200 and various other devices within the EGM cabinet using the power and data connectors. In some instances, the power and data pathways may be temporary in that they are only used during the installation process. In other instances, the power and data pathways may be more permanent in that the power and data pathways are utilized when the EGM is available for wager-based game play. The new power and data pathways may be wired or wireless pathways. All or a portion of the power and data connectors in any combination, which vary from EGM to EGM, may be used to establish the new power and data pathways. In one embodiment, the new power and data pathways can be utilized without modifying software executed by the game controller prior to installation of the secondary device 200.

In one embodiment, face 202a includes a number of serial data ports. For example, four USB ports 206 and five ports, 218, 220, 222, 224 and 226 which allow serial data communications using other serial communication protocols are provided. Other types of serial ports using different communications protocols can be provided and the secondary device 200 is not limited to a USB protocol. Devices, which can be coupled to these ports in different embodiments, are described in more detail as follows with respect to FIGS. 6, 9 and 11.

Ports 210 can be used to couple a keyboard and mouse to the secondary gaming device 200. In one embodiment, the keyboard and mouse can be used only during the installation process to install software and configure the secondary gaming device 200. In addition, the video port 208 can be used during the installation process. For example, port 208 can output video associated with a configuration interface generated by device 200.

A number of power related connectors are provided. For example, ports 215 and 216 can be used to receive power, such as a 12 DCV power. A power source, such as an AC power source can be converted to the DC voltage. Other voltages are possible and 12 Volts is provided for illustrative purposes only. The connection format is different for each port. For example, port 215 accepts a round connector while port 216 accepts a rectangular connector. Ports 236 and 238 can be used to supply power to other devices coupled to the ports. In addition, the USB ports 206 can be used to provide power to devices coupled to the secondary gaming device.

The secondary gaming device can include a number of video and audio ports. For example, port 208 is a video port which can be used to output video from the device 200. In one embodiment, port 208 may only be used when device 200 is installed, serviced or verified form regulatory purposes. In one embodiment, the port 208 is a VGA compatible. In other embodiments, different video interfaces can be used, such as DVI or a mini-Display-Port. Port 212 can be used to output video and audio signals. In one embodiment, it is HDMI compatible port. An example of a configuration using port 212 is described with respect to FIG. 11. Port 228 can be used to output audio signals. Port 230 can be used to receive audio signals, such as from a microphone. The USB ports 206 can be used to receive and send audio and video signals.

The secondary device can include a number of network connectors for communicating with remote devices, such as remote servers or portable electronic devices. For example, port 214 can be used to establish a network connection, such as an Ethernet connection. Further, one of the USB ports can be used to couple gaming device 200 to a wireless interface. For example, a radio candle mount, as described above, can be coupled to the secondary gaming device via one of the USB ports 206. The secondary gaming device 200 can be configured to utilize one or both of wireless and wired communication interfaces for network communications.

One or more status related devices can be provided on secondary gaming device 200. For example, a light 232 can be provided which indicates the secondary gaming device is receiving power. In another embodiment, a light (not shown) can be provided which indicates the secondary gaming device is in a ready or operational state. A switch 234 can be provided for resetting or cycling power on the secondary gaming device. A pin can be inserted through an aperture to activate switch 234 and cycle power on the secondary gaming device. Next, details of internal components of a secondary gaming device are described with respect to FIG. 6.

Figure 6:
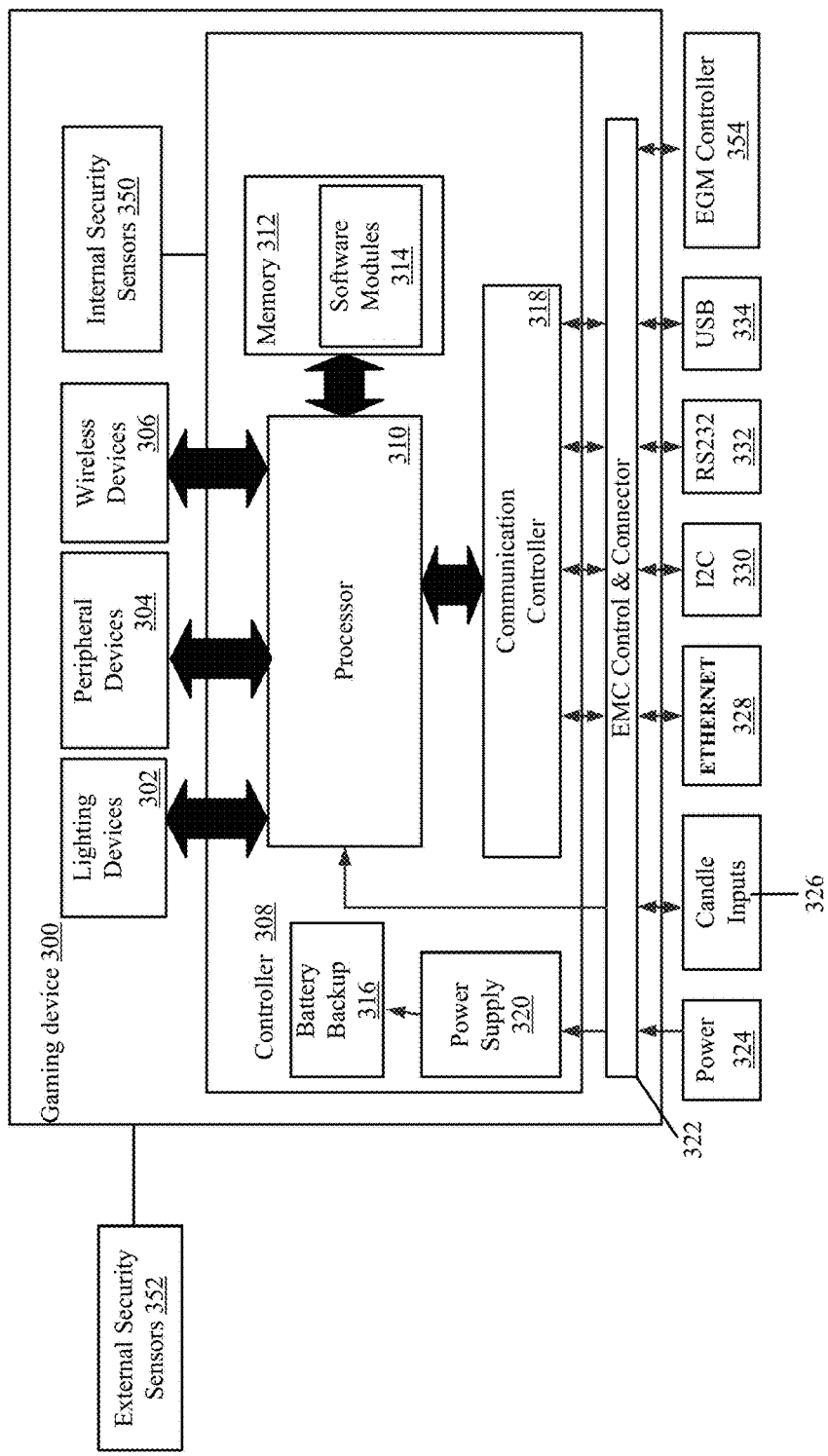
FIG. 6 is a block diagram of a gaming device in accordance with the described embodiments.

FIG. 6 is a block diagram of a secondary gaming device 300 according to an embodiment. All or a portion of the components of the secondary gaming device 300 described with respect to FIG. 6 may be applicable to the secondary gaming devices described above with respect to FIGS. 4 and 5. In one embodiment, the gaming device 300 can be configured to for operation within an interior of an EGM. In this embodiment, the secondary gaming device 300 may or may not include candle inputs 326.

In another embodiment, the secondary gaming device can be a candle device, such as candle device 2, shown in FIGS. 3 and 4, where all or a portion of controller 308 is located within the candle housing. In yet other embodiments, the secondary gaming device can include portions which are located within the interior of the EGM and portions which extend from or form an outer surface of the EGM cabinet. For example, the controller portion of the secondary gaming device can be located in the interior of the EGM and control devices mounted to the exterior of the EGM or the controller can be located in a housing on the exterior of the EGM and control devices at least partially within the interior of the EGM cabinet, such as a display, a value input device or a value output device.

In one embodiment, all or a portion of the inputs and outputs to the secondary gaming device 300 pass through an EMC control & connector component 322, providing electromagnetic compatibility limiting unwanted emissions from the controller 308 and limiting the susceptibility or immunity from unplanned electromagnetic disturbances. This type of connector may be required to conform to EMC standards such as FCC Parts A & B, IEC, and CSAA. To thwart the security of a gaming machine, individuals have been known to generate electromagnetic disturbances to gaming machine components. Further, an electrostatic potential can be build up on a person that is discharged into a gaming machine when the person touches the gaming machine.

The EMC control 322 can prevent unwanted electromagnetic occurrences generated on the secondary gaming device 300 from propagating to devices disposed within the interior of a gaming machine cabinet to which the gaming device 300 can be coupled. In the embodiment, where the secondary gaming device 300 is installed within an EGM cabinet (see FIG. 5), the EMC control and connector 322 may configured to block electromagnetic disturbances from propagating into the device via its various connectors. For example, when the secondary gaming device is installed internally and is coupled to an external candle device, the EMC control 322 can prevent electromagnetic disturbances from entering into the secondary device 300 from the connections between the secondary device and the candle device.

The power input 324 can be configured to provide the input voltage source for the candle power supply 320. In one embodiment, the power supply can be coupled to an AC power in line for the gaming machine. Typically, input voltages range from 12V to 24 VDC. When the gaming device 300 is used with a gaming machine, the power input 324 can come from an internal power supply within the EGM's cabinet. The power supply 320, which is coupled to the power input 324, provides the various output voltage sources for the internal circuits of the secondary gaming device 300. In one embodiment, the gaming device 300 can include voltage conversion circuitry, such as step down circuitry that enables devices requiring varying voltages less than the input voltage to be supplied with power. The stepped down voltages can be provided to devices internal to the secondary device 300 or to devices coupled to the secondary device via one of its power and/or data interfaces, such as a USB device coupled to the via interface 334.

In one embodiment, the power supply 320 can be coupled to a battery backup 316 and used to provide the charging voltage source for the battery backup circuit 316. Many gaming jurisdictions require certain devices, such as security monitoring circuitry on a gaming machine, to include a battery backup in case of casino or machine power failure. Further, the gaming jurisdictions can require a back-up transmission method for receiving data preserved and/or gathered during a power failure. The machine power failure could be a result of a main power grid failure or a local machine power failure that resulted from an attempted security breach (e.g., deliberately cutting power to the gaming machine) or other reasons. The security monitoring circuitry can be configured to detect and store any attempt to open an EGM door during the power failure which provides access to an interior of the EGM cabinet (e.g., see 404 in FIG. 7). The monitoring circuits are typically part of the gaming machine's components. In one embodiment, the monitoring circuits can be linked to the candle.

A battery backed-up transmission method can be configured to provide a way to communicate security information during or immediately upon a power-up. In one embodiment, the method can allow for limited communications even during the power-interruption, such as an alert that a security related event is now in progress or that power has been lost to the gaming machine. The power-up can process can be initiated any time a gaming machine loses power, such as after a gaming machine is moved within the casino, transferred to another location outside the casino or following a power failure. The battery backup 316 can be used to provide a power back-up for one or more of the memories within the candle and provides a timing wake-up input to the controller 308 to store and communicate any security information received during the power failure. The timing set point for the wake-up can be minutes or hours depending on jurisdictional or/and operator requirements.

In one embodiment, the controller can monitor internal security sensors 350. The internal security sensors can be configured to detect unauthorized access to a component of the secondary gaming device 300. For example, in some embodiments, the controller 308 can be enclosed within a housing and an internal security sensor can be configured to detect when the housing is accessed, such as via a locked port, taking the housing a part to access the interior or even damaging the housing to access the interior. In another example, the housing can include one or more external ports and the internal sensors can be configured to detect when a device is connected to or removed from one or more of the ports. In yet another example, the housing can include sensors for detecting when a component, such as a board including controller 308 or a memory device, is removed or installed on the secondary gaming device.

In yet other embodiments, the gaming device 300 can be configured to receive data from external security sensors, such as sensors within an EGM cabinet or sensors external to an EGM cabinet. An EGM controller, such as 354, on the EGM may also monitor one or more these security sensors. For instance, the EGM cabinet can include security sensors for detecting when an exterior door to the EGM cabinet is opened. As another example, the EGM controller 354 can be located within a locked enclosure and a security sensor can monitor when the locked enclosure is accessed. Further, security sensors can be provided for detecting when devices are connected to or removed from various power and communication interfaces. In yet another example, security sensors can detect when devices, such as the bill validator, the printer or a drop box for the bill validator is removed and replaced. These sensors can be monitored by one or both of the EGM controller 354 and the controller 308.

In one embodiment, a new security sensor can be added as part of a retrofit process. The EGM controller 354 may not include software for interacting with the new security sensor. Rather than updating the EGM controller 354 via a software modification, the controller 308 can be configured to handle monitoring of the new security independently of the EGM controller 354. For instance, an image capture device can be used as a security sensor to gather security information. The image capture device can be added as part of a retrofit process where the controller 308 is configured to monitor the image capture device independently of the EGM controller 354.

In one embodiment, all or a portion of the communication channels associated with an EGM can be routed through the secondary gaming device 300 with the communication controller 318. Pass through communication can include communications between an EGM controller 354 or other peripheral device on the EGM (e.g., player tracking unit, bill validator, printer, card reader, etc.) and a remote server that is passed through the gaming device 300. The pass through communications can be transmitted wirelessly, via a wired communication connection or combinations thereof. For example, a portion of the communications can be transmitted wirelessly and a portion can be transmitted via a wired communication connection. In some instances, particular communication types, such as from a particular device, may be transmitted via only one communication mode, such as wirelessly or wired communications. In other embodiments, the communication mode used for a particular communication type can be varied over time (e.g., using wireless at a first time, wired at a second time and then wireless at a third time). As described above, the radio candle mount can be used as a wireless interface for wireless communications.

These communications channels may support various communication protocols. Thus, the controller 308 can be configured to parse and generate messages associated with various communication protocols. For instance, the communication channels can be used to implement one or more of Ethernet 328, I2C 330, RS-232 332 and/or USB 334. Other communication protocols that may be used are RS-485, IEEE 1394 (Firewire), Netplex and other standard or proprietary serial or parallel communication protocols used in the gaming industry as well as the computing industry. If available, these channels can be implemented as wired or wireless embodiments. For instance, a wireless communication protocol, such as but not limited to wireless USB, Wi-Fi, WiMAX, NFC, RFID or Bluetooth can be implemented to allow for wireless communications between the secondary gaming device 300 and other devices within the EGM or external to the EGM. One or more different wireless interfaces can be used to implement these wireless communication protocols. Besides, wireless communications, wireless power transmission may also be supported in secondary gaming device 300.

Depending on the number of gaming systems to which a gaming machine is connected, some EGMs may utilize only a single external communication channel connection while others may utilize multiple channels. The communication controller 318 can be configured to provide the non-intrusive multiplexing and de-multiplexing of the wireless and wired communication interface data. Thus, the communication controller can be implemented with no change or interference to any protocol or related data from or to the gaming machine. The non-intrusiveness can allow an existing gaming machine to be equipped with a gaming device 300 utilized for external communications purposes without altering existing gaming software, such as regulated gaming software used by a gaming controller on a gaming machine or gaming system software used by back-end servers coupled to the gaming machine, as well as without interference between protocols or related data from or to the gaming machine. As described herein, the secondary gaming device 300 can provide other functions without altering existing gaming software and the example of communications is provided for the purposes of illustration only. In additional embodiments, the communication controller 318 can be configured to detect player messages from a player tracking unit and communicate with devices, such as servers associated with a player tracking system. Also, the communication controller 318 can be configured to communicate with portable electronic devices utilized by casino personnel and casino patrons alike.

Figure 9:
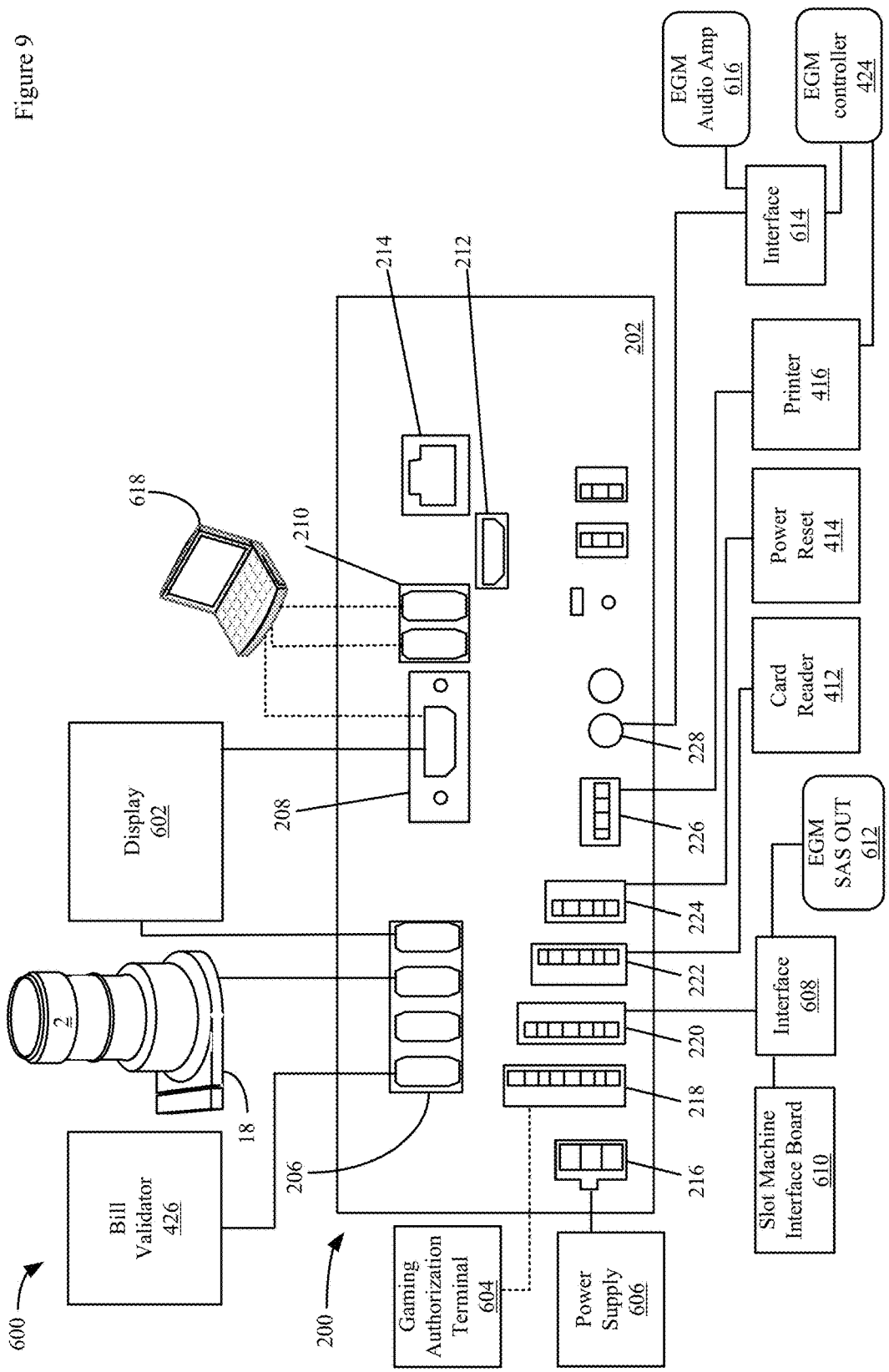
FIG. 9 is a connection diagram of a gaming device coupled to an electronic gaming machine in accordance with the described embodiments.

EGM Integration of Secondary Gaming Devices with Wireless Communication Capabilities With respect to FIGS. 7, 8 and 9, the integration of secondary gaming device with wireless communication capabilities, such as provided by the radio candle mount, are discussed. Further, the operation of an EGM configured to provide wager-based gaming is also discussed. In various embodiments, the EGM can be retrofitted with a secondary gaming device and/or a radio candle mount.

FIG. 7 is a perspective drawing showing exterior portions of an electronic gaming machine 450. A radio candle mount 18 is disposed between a candle 2 and a top portion 406 of an EGM cabinet. In this example, the top portion 406 is a top box. In various embodiments, EGMs can include or not include a top box. The radio candle mount 18 may have been installed when the EGM 450 was manufactured or as part a subsequent retrofit process. The candle 2 can be an enhanced candle as described with respect to FIGS. 3 and 4 or a more basic device. A controller associated with a secondary gaming device (e.g., see FIGS. 4, 5 and 6) or an EGM controller can coupled to and configured to use the one or more wireless interfaces associated with the radio candle mount 18.

The gaming machine 450 can be used to play a wager-based game. The wager-based game can be generated under control of a game controller disposed within a main cabinet 430. The door 404 can be opened to provide access to an interior of the EGM (e.g., see FIG. 8). As described above, one or more secondary gaming devices, such as described with respect to FIG. 5 can be disposed within the interior of the EGM.

The gaming machine can include a player tracking panel 405 (e.g., a display 410, a card reader 412 and/or a key pad (not shown)) for performing player tracking transactions, a monitor or reel area 420 for displaying the wager-based game, a player input panel 446 (generally having buttons) for making selections associated with the play of the wager-based game, such as for inputting game related decisions and wager amounts, a coin-in acceptor 444 for accepting coins, a bill acceptor 426 for accepting bills, printed tickets and/or cashless media, a coin-out device (hopper) for outputting coins and/or tokens to tray 448, and a ticket printer 416 for generating cashless or promotional tickets. In addition, the ticket printer 416 can be used to generate other types of printed documents, such as receipts, boarding passes, tax forms, lottery tickets, keno tickets, etc.

Many different types of EGMs including tables used for table games can be equipped or retrofit with the radio candle mount 18 and secondary gaming devices as described herein and the EGMs are not limited to the example shown in FIG. 7. The EGMs can have different combinations of devices than those shown in FIG. 7. For instance, some EGMs may not include a coin acceptor or a coin hopper. Further, different types of gaming machines, such as class II bingo type EGMs or lottery terminals can also be equipped with the radio candle mounts and/or secondary gaming devices described above.

The EGM 450 can have a game controller (not shown) disposed within a locked enclosure (see 424, FIG. 8). The game controller can be configured to control a wager-based game played on the gaming machine including receiving wagers on the outcome of a game. The game controller can include a random number generator that is used to determine outcomes. In addition, the game controller can be connected to a number of devices that are used during operation of the gaming machine. For instance, the game controller can be communicatively coupled to the candle 2, the monitor 420, the printer 416, the bill/ticket acceptor 426, the player input panel 405, the coin-in (acceptor) 444, the coin-out (hopper) 432 (see FIG. 8) and the audio system 418 (see FIG. 8).

The game controller can be configured to send commands to the peripheral devices that control their operation and receive data, such as acknowledgement of the commands from the peripheral devices in response. The game controller can execute regulated gaming software to perform these functions. The game controller can also access various network interfaces that allow the game controller to communicate with external devices. For example, the player tracking panel 405 can include a player tracking communication interface (see 608, FIG. 9), which can be used by the game controller to communicate with external devices.

In one embodiment, the monitor 420 can be a touch screen display. The display can be configured to receive video content from each of the game controller and a secondary gaming device described above. For example, first content from the game controller can be displayed on portion 440 of the display 420 and second content from a controller in the secondary gaming device can be displayed on portion 442 of the display 420.

In one embodiment, the controller associated with the display 420 can be configured to receive sizing, scaling and positioning commands that allow content received from multiple sources to be displayed in different portions of the display. In another embodiment, a secondary gaming device (see 690, in FIG. 11) can include a controller for performing these functions. In yet another embodiment, a secondary gaming device, such as described above with respect to FIGS. 4 and 5 can perform this function.

The sizing, positioning and scaling commands can result in content sent to the display 420 to be output in a stretched or a compressed format relative to the native resolution in which content the content is generated. For example, video content output from a game controller in a native format can be stretched or compressed. As described above, one or more of the controllers on the EGM can be configured to generate translation functions for the video input and for the touch screen output that interpolates the video input to fit within a designated display area and interpolates the touch screen output to account for positioning and scaling commands received from an external device.

The touch screen display 420 can be the main display the gaming machine 450 where video content associated with a wager-based game generated by the game controller is displayed. The game controller can be configured to output the video content in a native resolution, such as 640 by 480. The native resolution can vary from EGM to EGM. The video content can include indications of locations where a touch detected by a touch screen can cause the game controller to perform an action in response. For instance, in response to a detected touch, the game controller can change the video content output to the touch screen display.

In one embodiment, the touch screen display 420 can be a replacement display such that it replaces the display installed in the EGM during its manufacture. For example, the replacement display can be installed during a retrofit of an EGM. When used as replacement display, the touch screen display 420 can have a resolution that is greater than the native resolution in which the video content output by the game controller is generated. For instance, the touch screen display 420 can have resolution of 1280 by 960 while the native resolution of the content output by the game controller 16 is 640 by 480. When a display technology with a fixed pixel size, such as an LCD, is used as the replacement display, interpolation and/or smoothing can be utilized to scale the content output from the gaming controller to fit the resolution size of the display. These functions can be performed by a controller on the EGM, such as a controller associated with a secondary gaming device, which is installed as part of a retrofit. In another embodiment, one or more of these functions can be performed by a controller associated with the display 420.

As described above, a first controller can be configured to receive sizing, positioning and scaling related commands, which affect video content output to the display 420, such as video content from a plurality of different sources. In one embodiment, a secondary controller is configured to generate these sizing, positioning and scaling related commands and not the game controller. For instance, the secondary controller can be configured to select picture in a picture modes that allows the video content output from game controller to be displayed on different portions of the touch screen display at different resolutions where the native resolution output by the game controller and sent to the touch screen display is constant and is altered after it generated via one or more secondary controllers.

The sizing, scaling and positioning commands can be associated with picture-in-picture (PIP) capability of the display 420. Using the PIP capability, video content can be transmitted from a secondary gaming device and displayed as a PIP mode on the display 420. In one embodiment, the video can be transmitted via a USB interface (see 206, in FIG. 9). Via a secondary gaming device, the PIP capability can be used to output real-time or stored video for the player. The real-time video can be received from a remote source, such as a server located on an internal or external network (see 506, in FIG. 10)

In one embodiment, one or more secondary gaming device can control the PIP independently from the game controller. Thus, the game controller may not be aware that the video content that it is outputting is affected by PIP commands issued by the one or more secondary gaming devices or that the one or more secondary gaming devices is sending control commands to the display 420. Thus, the PIP capabilities can be provided in a retrofit situation without modifying the game software executed by the game controller prior to the retrofit.

In another embodiment, the game controller can be configured to transfer or allow control of the display 420 by a secondary gaming device. Thus, the game controller may be aware of the secondary gaming device and configured to communicate with it in some manner. As an example, the game controller can be configured to hand over control to a secondary gaming device to allow it to display a bonus game presentation or a wager-based game presentation on all or a portion of the touch screen display 420. Thus, game controller can engage in bi-directional communications with the secondary gaming device to indicate when the display is available and the secondary gaming device can communicate when it is finished using the display. When the secondary gaming device indicates it has completed displaying the bonus game presentation or outputting some other type of video content, the game controller can reassume control of the display 420. When the game controller controls the display, it may prevent a controller on a secondary gaming device from outputting content to the display 420.

FIG. 8 is a perspective drawing showing exterior and interior portions of an electronic gaming machine 400 in accordance with the described embodiments. The EGM 400 includes a different arrangement of components then shown in FIG. 7. For example, the printer 416 is located above display 420 in FIG. 8 as opposed to below display 420 as shown in FIG. 7. In addition, the EGM 400 presents different form factors. For example, top box 406 is rectangular shaped in FIG. 7 but includes a rounded portion as shown in FIG. 8.

A light source 408 and wiring panel 414 are disposed within an interior of top box 406. An aperture in a top of the EGM cabinet 430 on which the top box rests can allow data and/or power wires from the wiring panel to pass within an interior of cabinet portion 430. In addition, the aperture can accommodate data and/or power wires from a wiring harness associated with candle 2 and radio candle mount 18.

A support structure 422 surrounds display 420. In one embodiment, the display 420 can be an LCD. However, older EGMs can utilize CRT type displays. A locked enclosure 424 is positioned beneath the display 420. The locked enclosure 424 can include a game controller. When the enclosure is opened 424, an access port may be exposed which allows communications with the game controller and/or may allow the game controller to be removed. The locked enclosure 424 allows an interior of the EGM cabinet 430 to be accessed while still limiting access to the game controller in 424.

The locked enclosure can be monitored with various sensors which detect when the enclosure 424 is opened and/or a lock associated with the enclosure is actuated. As described above with respect to FIG. 5, the secondary gaming device 200 can include a locked port which allows access to an interior of a housing of the secondary gaming device and sensors for detecting when the interior of device 200 is accessed. Similarly, various sensors can be associated with the door 404 which detect when the door 400 is opened and/or a lock associated with the door 404 is actuated. The game controller in enclosure 424 can be configured to monitor security sensors associated with enclosure 424 and door 404. The secondary gaming device 200 can also be configured to monitor these sensors as well as its own security sensors.

A bill stacker 428 is positioned beneath the bill acceptor 426. The bill stacker 428 can receive currency, tickets and/or other media inserted into the bill acceptor. Typically, when the bill stacker 428 becomes full, the door 404 is opened and the bill stacker 428 is replaced with an empty bill stacker and the full bill stacker is taken to a room counting and auditing purposes.

A coin hopper 432 is position beneath the locked enclosure 424. The coin hopper 432 is configured to receive coins inserted via the coin slot 444 in door 404, count the coins and dispense coins into coin tray 448. In some embodiments, a portion of the coins from the hopper 432 are routed to a drop box which is periodically emptied.

In a retrofit, a secondary gaming device, such as 200 in FIG. 5, can be placed in an empty space in the EGM cabinet 430. For example, the secondary gaming device can be placed beneath the bill stacker 428. The placement location of the secondary gaming device can be selected to include enough space to accommodate the secondary gaming device, minimize the length of wiring paths and allow for wires to be routed from the devices to which the secondary gaming device is connected such that the wiring doesn't interfere with normal operations of the EGM. For example, it might not be desirable to route wires around or near the bill stacker 428 so that the bill stacker's removal and replacement doesn't pull out and disconnect the wires.

The internal arrange of devices can vary significantly from EGM to EGM. Thus, the secondary gaming device, such as 200, may be located in different locations and in different orientations depending on the internal configuration of the EGM. In one embodiment, a secondary gaming device, such as 200, can be placed in a top box 406 as part of a retrofit. In another embodiment, one secondary gaming device can be placed in the top box and another secondary gaming device can be placed in the EGM cabinet 430, such as beneath display 420. In yet another embodiment, the secondary gaming device can be mounted to an exterior surface of the cabinet, such as a candle 2 configured to provide enhanced gaming functionality and then communication connections can be routed through the interior of the EGM 400, such as through the top box 406 and EGM cabinet 430.

FIG. 9 is a connection diagram 600 of a secondary gaming device 200 coupled to an EGM. This configuration is provided for purposes of illustration only as different combinations of devices can be coupled to the secondary gaming device. For example, in some embodiments, the secondary gaming device 200 may not be connected to a card reader. In other embodiments, the secondary gaming device can be coupled to a camera (not shown). In yet other embodiments, the secondary gaming device can be connected to a candle device. In other embodiments, it may not be connected to candle device.

A first one of the USB ports 206 is connected to a value input device, which is a bill validator 426 in this example. The bill validator 426 can also be configured to communicate with the EGM controller 424. As described above, the EGM controller 424 can control a play of a wager-based game on the EGM including determining an outcome to the game, which may be a random outcome, and determining an award associated with the determined outcome. In various embodiments, the secondary gaming device 200 and the EGM controller can be configured to both communicate with and/or both control one or more of the devices on the EGM. For example, both the secondary gaming device 200 and the EGM controller can communicate and control a display, a printer or a bill acceptor. In other embodiments, the secondary gaming device or the EGM controller 424 may only communicate with and/or control a particular device. For example, the secondary gaming device can communicate with a wireless interface which is not communicatively coupled to EGM controller or the EGM controller can communicate with a bonus device, such as wheel, which is not communicatively coupled to the secondary gaming device.

In a retrofit, a communication connection can be interposed between a new communication pathway between the EGM controller and another device, such as the bill validator, or the new communication pathway can be added as a separate connection. For example, the EGM controller can communicate with a device, such as the bill validator, via one communication pathway coupled to a first port on the bill validator and the secondary gaming device can communicate with a device, such as the bill validator, via a second communication pathway coupled to a second port separate from the first port. As another example, both the EGM controller and the secondary gaming device can communicate with a device, such the bill validator, via a common port, where a connection was added during the retrofit which allowed the secondary gaming device to share the common port.

In a particular embodiment, the secondary gaming device may be able to interrupt a communication from the bill validator 426 to the EGM controller 424 or from the EGM controller 424 to the bill validator 426 and optionally generate a substitute communication. For example, the bill validator 426 can receive currency or a printed ticket and attempt to send the information to the EGM controller 424. The secondary gaming device 200 can be configured to interrupt the communication to the EGM controller 424 so that it doesn't reach the EGM 424 controller and instead process the communication and send a response to the bill validator. In another embodiment, the secondary gaming device 200 can be configured to route the interrupted communications to one or more remote devices via a network interface associated with the secondary gaming device. In some instances, when a signal is routed to a remote device, the remote device can be configured to generate a substitute signal.

In general, the secondary gaming device 200 can be configured to interrupt communications between two logic devices and optionally generate substitute communications on any communication pathway on which it is interposed between the two logic devices. For example, the secondary gaming device 200 can be interposed on a communication pathway between a card reader and a player tracking controller. After it is interposed, the secondary gaming device can be configured to interrupt a communication from the card reader to the player tracking controller or from the player tracking controller to the card reader. The secondary gaming device can then generate a substitute communication. In one embodiment, the substitute signal can be generated based upon information contained in the interrupted communication. In another example, the secondary gaming device can be interposed between the player tracking controller and the EGM controller.

Also, the secondary gaming device 200 can be configured to route communications between two logic devices to alternate devices. The communication routing can involve changing the destination of communication from its original recipient. For example, a communication sent from a bill validator 426 to the EGM controller 424 can instead be sent to another destination, such that the EGM controller 424 doesn't receive the communication.

In another embodiment, the communication routing can involve cloning all or a portion of a communication and sending it to one or more additional sources. For example, a communication sent from a bill validator 426 to an EGM controller 424 can be cloned such that the EGM controller 424 receives the communication and one or more additional devices receive all or a portion of the communication. The routing and cloning functions can be invisible to the devices which have sent a communication. For example, when the bill validator 426 sends a communication to the EGM controller 424 or vice versa, the bill validator 426 and/or the EGM controller 424 may not know that the secondary gaming device 200 has rerouted or cloned the communication.

In one embodiment, the secondary gaming device 200 may only monitor communications to and/or from the bill validator 426. For example, the secondary gaming device 200 can receive information related to monetary transactions performed on the bill validator 426, such a transaction amount and even an image of a bill or scrip which has been accepted, and data related to the performance of the bill validator, such sensor data and or data from bill validator controller, which can indicate a status of the bill validator. The sensor data and/or data from the bill validator controller may be used to schedule maintenance for the bill validator 426. For example, if the bill validator is rejecting currency or scrip which is above a threshold value, the secondary gaming device can determine maintenance is needed. This decision may also be determined by a remote device, which has received the bill validator information via the secondary gaming device.

In another embodiment, the secondary gaming device 200 can be configured to send data to the bill validator via the connection between the bill validator and the secondary gaming device. For example, the secondary gaming device 200 can be configured to download new firmware to the bill validator. In another example, the secondary gaming device 200 can be configured to send commands to the bill validator, such as command to reboot itself or a command to adjust operation of a sensor on the bill validator. In general, the secondary gaming device 200 can be configured to directly communicate with a controller on any of the devices to which it is connected. The communications can involve sending commands and/or data including software, which affects operation of the device.

A second one of the USB ports 206 is coupled to the radio candle mount 18. Via this communication interface, the secondary gaming device 200 can be configured to send and/or receive wireless communications. In one embodiment, the secondary gaming device 200 can be also coupled to a candle device 2, via one of the USB ports. A third one of the USB ports is coupled to a display 602. In various embodiments, the display 602 can be a main display on the EGM on which all or portion of a wager-based game is output, a secondary display on which the EGM controller 424 displays secondary information, such as bonus information, a player tracking display on which a player tracking controller displays information or a separate display, which is controlled by the secondary gaming device, alone or in combination with a remote device. In other embodiments, other devices can be coupled to one of the USB ports 206. For example, a camera or other security device can be coupled to one of the USB devices.

In particular embodiments, one or more of the USB ports can be configured to only connect to a particular type of device. For example, the secondary gaming device 200 can be configured to only recognize the bill validator 426 when it is connected to the first USB port of the four USB ports. If a bill validator 426 is coupled to one of the other three USB ports, the secondary gaming device can be configured not to recognize the bill validator. Further, if another type of device is coupled to the first USB port, the secondary gaming device 200 can be configured not to communicate with the device. In other embodiments, a greater number of USB ports, a lesser number of USB ports or no USB ports can be included on the secondary gaming device.

Typically, part of the USB protocol includes allows different types of devices to use a standard port. For example, a USB compatible keyboard can be plugged into the same port as a USB compatible mouse. Thus, a restriction of a particular USB port to a particular USB compatible device is not usually associated with USB.

Five serial ports, 218, 220, 222, 224 and 226, of different sizes and orientations are disposed beneath the USB ports 206. In one embodiment, each of the non-USB serial ports can be configured to accept a particular type of device. The different ports sizes and orientations can be used to reduce installation mistakes, such as during a retrofit. If all the ports where the same size and the same orientation, then two different devices might be misconnected. For example, a printer 416 could be connected in the card reader port 222 and a card reader 412 could be connected in the printer port 226. The different sizes and/or different orientations (a vertical versus horizontal orientation) helps to ensure the devices are correctly connected. Even though the ports sizes are different, the same communication protocol can be used on all or portion of the non-USB ports. For example, two or more of ports, 218, 220, 222, 224 and 226, can utilize an RS-232 communication protocol.

In the example of FIG. 9, port 218 is a spare port. However, it can also be used to support regulatory functions, such as verifying software installed on the EGM. Thus, in one embodiment, a gaming authorization terminal 604 or other type of device configured to perform regulatory functions can be coupled to the secondary gaming device 200 via port 218. In another embodiment, another device, such as a connection to a button panel or button on the EGM can be established via port 218.

Port 220 is configured to receive slot accounting communications from an EGM controller 424. In the example, an interface 608 is interposed between the EGM SAS out 612 and a slot machine interface board (SMIB) 610. In one embodiment, the interface 608 can have two components—a microcontroller board, and the harnessing. The microcontroller board, which may include proprietary firmware, can be a passive or active device that monitors communication between the EGM and the SAS host controller for the purpose of relaying information to the secondary gaming device.

The SMIB 610, often coupled to a player tracking unit, is used to communicate EGM accounting information to a remote device. In this example, via the interface 608, the secondary gaming device 200 can be configured to receive accounting related information from the EGM controller 424 sent via SAS interface 612 and forward it to a remote device if desired. Further, the secondary gaming device may be able to send certain SAS enabled commands to the EGM controller 424, such as a command to add promotional credits to an EGM or print a promotional ticket. As described above, the secondary gaming device 200 can be configured to interrupt and generate substitute communications on this communication pathway.

SAS is one example of a communication protocol which an EGM controller, such as 424, can use to communicate with a remote device. The Slot Accounting System (SAS) protocol was initially designed to automate slot machine meter reporting and event logging, SAS has evolved over the years to include player tracking, bonusing, ticketing and cashless gaming. SAS can be considered a casino communications standard because of its availability to all manufacturers in the industry.

The Gaming Standards Association (GSA), representing a broad range of gaming industry manufacturers and operators, adopted SAS 6 as a recognized communications standard for the industry in July of 2002. The latest version of the protocol is SAS 6.02, which is fully backward compatible with all previous versions. SAS 6.02 complies with the latest Nevada Gaming Control Board Technical Standards for gaming machine accounting, as well as providing complete multi-game and multi-denomination accounting. In various embodiments, the secondary gaming device can be configured to support different versions of SAS and other gaming specific communication protocols, such as protocols related to slot accounting.

Port 222 is coupled to a card reader 412. The card reader 412 can be an existing card reader or one that is added during the retrofit. A microcontroller tap can be used for an existing card reader, such one on a player tracking unit coupled to an EGM. The microcontroller tap can plug in between the existing card reader and a SAS host controller. A new player card reader, which may be installed during a retrofit, can include a built-in port that directly connects to the secondary gaming device 200.

Typically, a card reader, such as 412, on an EGM communicates with and is controlled by a player tracking controller on the EGM. Via an interface, such as the microcontroller tap to the card reader 412, the secondary gaming device may be able to receive information from inserted cards and perform functions not supported by a player tracking controller.

As an example, most player tracking controllers only recognize magnetic striped cards associated with a player tracking club. Via the interface to the card reader 412, the secondary gaming device 200 may be able to recognize other types of cards, such as a credit and debit card inserted into the card reader. The information read from a credit or debit card might be used to perform a value transaction or merely identify a person which may not have a player tracking card. As described above, the secondary gaming device 200 can be configured to interrupt and generate substitute communications on this communication pathway. For example, when a credit card is inserted in the card reader, communications from the card reader 412 to a player tracking controller may be interrupted or cloned.

Port 224 can be coupled to a power reset device 414. A power reset device 414 can be used to cycle power for one or more devices on the EGM including the EGM controller 424. Additional details of a power reset device are described in U.S. patent application Ser. No. 13/890,285, titled, "REMOTE POWER RESET FEATURE ON A GAMING MACHINE," filed May 9, 2013, by Wells, et al., which is incorporated by reference and for all purposes.

Port 226 is coupled to a printer 416. The secondary gaming device can be configured for real-time remote monitoring of the health of the ticket printer (paper low, paper out, ticket jams, etc.), allowing for quick resolution by floor personnel. In particular embodiments, the secondary gaming device can monitor both Future Logic GEN2 Universal printers (Glendale, Calif.) connected via the second port on the printer and TransAct Epic950 Printers (Hamden, Conn.) connected via TransAct's eServer Port. Other types of printers can be monitored and these are provided for the purposes of illustration only.

Port 228 is coupled to an EGM audio amplifier 616 via interface 614. In this embodiment, the interface is interposed between the EGM controller 424 and the audio amplifier 616. Via the interface, the secondary gaming device 200 can be configured to output audio signals via speakers existing on the EGM. The speakers may also receive audio signals from the EGM controller 424. The audio signals from the secondary gaming device can be mixed with or output separately from the audio signals generated from the EGM controller 424.

A power supply 606 is shown coupled to port 216. In one embodiment, an AC voltage associated with the EGM's power supply can be converted to a DC voltage. The DC voltage can be input via power port 216.

A terminal 618 is shown coupled to ports 208 and 210. In one embodiment, the terminal can support video, a keyboard and a mouse or touchpad. Typically, the terminal may be coupled to ports 208 and 210 during installation, repair or maintenance. In one embodiment, these ports may only be used for these purposes. In other embodiments, the ports can be used to support other devices outside of installation, repair or maintenance. For example, port 208 can be used to output video signals to a display device 602 coupled to the EGM while the EGM is operational for game play. Next, details of gaming network with EGMs coupled to secondary gaming devices and/or radio candle mounts are described with respect to FIG. 10.

Figure 10:
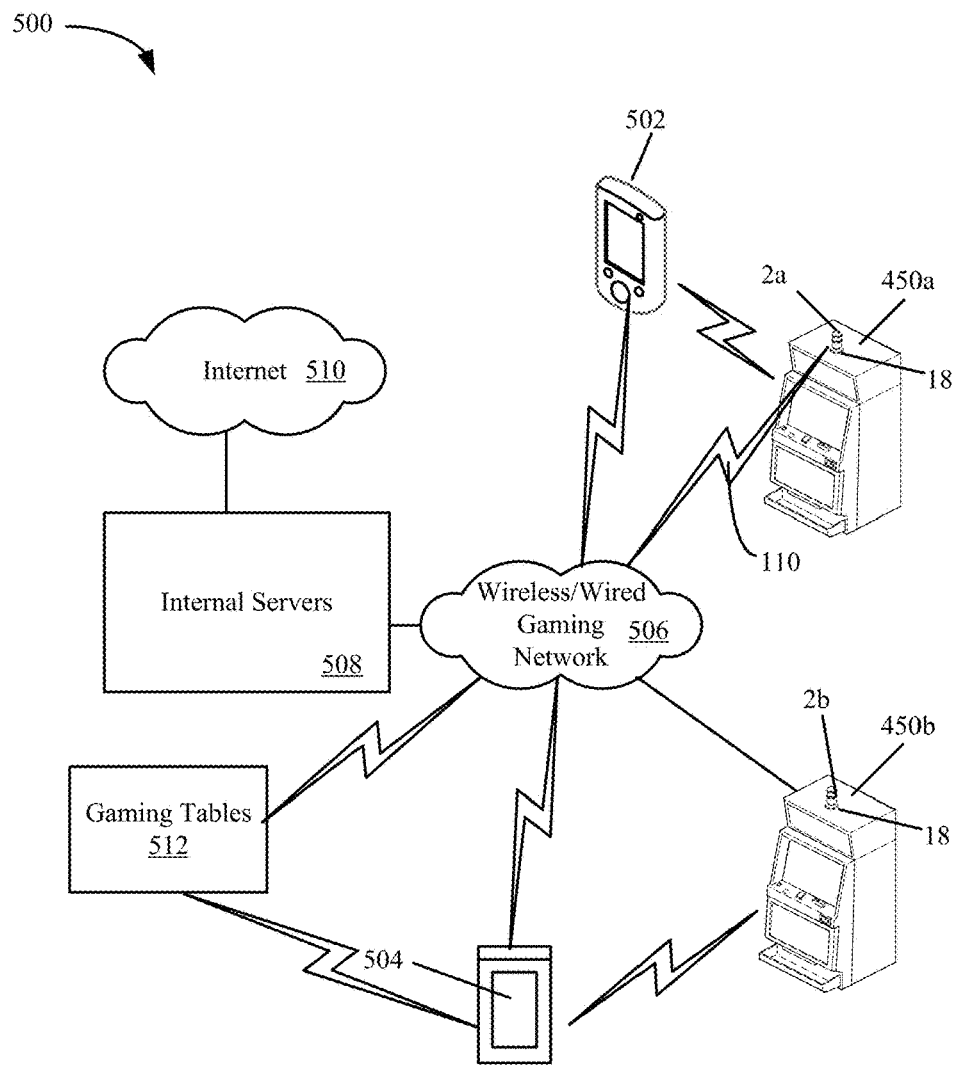
FIG. 10 is a diagram of a gaming system including gaming machines outfitted with candle devices and configured to communicate with mobile devices in accordance with the described embodiments.

FIG. 10 is a diagram that illustrates a gaming system 500 including EGMs outfitted with candle radio mounts that wirelessly communicate with servers in accordance with the described embodiments. In one embodiment, the gaming system can include one or more EGMs, such as 450a and 450b. The EGMs can be different models and types supplied by different gaming machine manufacturers. The EGMs can each be equipped with candle device, such as 2a and 2b, which can be secured to the gaming machines with candle radio mounts 18 where the candle radio mounts 18 are disposed between the candles 2a and 2b and a top of the EGM cabinet.

The candle radio mounts 18 can include one or more wireless communication interfaces as described above. Using the wireless capabilities of each radio candle mount, a gaming network 506 can be provided. Via the gaming network 506, various gaming devices can utilize the candle radio mounts for communications. For example, as described with respect to FIG. 11, the gaming devices can communicate with a network switch 656. The network switch 656 can transmit and receive data from different devices in the gaming network 506. In one embodiment, the network 506 may allow peer-to-peer communications, such as between EGMs 2a and 2b and/or table games (not shown).

In one embodiment, the network switch can be configured to de-multiplex/de-encrypt the data stream from the gaming machines equipped with wireless and/or wired capabilities and send the resultant data streams to internal servers 508 to which particular wireless communications are addressed. For example, the internal servers 508 can be implemented on one or more devices with processors and memory to provide services, such as but not limited to progressive games, accounting, cashless transactions, player tracking, picture in a picture, hotel reservations, entertainment reservations, games including bonus games, software, health monitoring, maintenance, valet, transportation, sports book, and security associated with a casino operation.

In addition, communications can be provided to servers outside a local casino area network via the Internet 510. For example, access to social media sites including the ability to push or pull data from social media sites can be provided. In another example, airline servers which allow check-in and boarding pass generation including printing a boarding pass at the EGM can be provided. In yet another example, access to review sites, such as Yelp™. In general, the Internet 510 communications can enable services that depend on access to servers located on an external network. The Internet 510 communications can be firewalled and limited to prevent attacks, such as hacking attacking, from outside on the gaming network 506 on gaming devices within the gaming network 506.

In particular embodiments, wireless access points can be provided that allow a portable electronic device, such as 502 and 504, to communicate with other gaming devices in the gaming network 506. For instance, via a Bluetooth™ interface in the candle radio mounts, 18, a portable electronic device can be allowed to communicate with one or more of the internal gaming servers 508. As another example, wireless access points (e.g., see FIG. 11) providing support for one or more different wireless communication protocols can be distributed throughout a gaming environment, such as a casino, which allow communications with one or more of the internal gaming servers 508. In one embodiment, the servers 508 can support a hospitality application executing on the portable electronic device. For instance, MGM resorts International™ provides an "M life" players club application that can be executed on a player's portable electronic device, such as 502 or 504.

In another example, the EGMs, such as 1*a* and 1*b*, can include other devices capable of communicating with a portable electronic device. For example, an EGM can include a secondary device, such as a bill validator, which is configured to receive account information that enables electronic cash transaction from a portable electronic device. In one embodiment, the portable electronic device can include an NFC (Near field Communication) interface that can communicate account information via a NFC interface on the EGM, such as an NFC interface on a bill validator. As an example, the portable electronic device can execute an electronic wallet application that supports electronic purchases via an NFC interaction like PayPass™ by MasterCard™. The electronic wallet application can be used to initiate a transfer of funds that allows credits to be deposited onto the gaming machines.

As mentioned above, a few other examples of servers that can be coupled to the wireless gaming network 506 can include servers in other gaming establishments, servers associated with gaming regulators, third-party servers, servers providing game downloads and peripheral software updates, security server, servers providing hotel hospitality, travel, weather and lodging information and outside access to servers via the Internet. As an example of a server in another gaming establishment, one of the internal servers can be configured to contact a remote TITO (Ticket-in/Ticket-out) server in another gaming establishment to validate a printed ticket remotely issued outside of the gaming establishment in which the server is located and forward the validation information to an EGM. As an example of a communication with a gaming regulator, one of the servers 508 can be configured to communicate with a gaming regulator to notify the regulator of a regulated change to a gaming machine, such as a change in regulated gaming software on one of the EGMs.

Gaming operators can allow third-parties affiliated with a gaming establishment to provide promotional opportunities and other services to players on the EGMs coupled to 506. The one of the servers 508 can be configured to communicate with an EGM to provide a third party promotional opportunity. As an example, via one of the servers 508 and the gaming network 506, a ticket can be printed at the gaming machine that allows a discount on a merchandise item or a service provided by the third party. In some embodiments, the tickets can be customized using a format selected by the third party and approved by the gaming operator.

The one or more servers 508 can be configured to allow a remote server to communicate highly regulated or less regulated gaming software to a gaming device. One difference between highly regulated and less regulated software can be the amount of testing and approval time required before the software is allowed to be used in a gaming environment. Highly regulated gaming software typically includes logic related to generating a wager-based game on the gaming machine, such as determining an outcome and an associated award. This software and any other software executed by a game controller on an EGM that provides this functionality is typically not changed once an EGM leaves the manufacturer and is deployed to the field.

An example of less regulated gaming software may include firmware used by a peripheral device, such as firmware used by a bill validator or printer to report information used for health monitoring, firmware used by a bill validator to detect fraudulent currency or firmware used by a printer to print customized tickets. If the bill validator accepts a bill or an instrument that is later determined to be counterfeit, then new software can be downloaded to the bill validator to detect other bills or instruments with similar characteristics so that additional counterfeit bills or instruments are not accepted. One of the servers 508 can be configured to transmit and receive verification information that allows a remote server to verify that authentic software has been installed on a gaming device, such as gaming machine.

Each gaming machine can be connected to a different combination of gaming system servers, such as but not limited to a player tracking server, a wide area progressive server, a link progressive server, and the TITO Server which can be included in the internal servers 508. For instance, a first gaming machine, such as 450*a*, can be connected to only the casino back-room server while a second gaming machine can be connected to the player tracking server and the TITO server. The one or more internal servers in conjunction with a secondary gaming device on the EGM, as described above, can be configured to allow different EGMs to receive different data streams depending on an external device configuration in the secondary device and the external device configuration in the EGM controller where the external device configuration in the secondary device can be different from the external device configuration in the EGM controller which communicates to external devices via the secondary gaming device.

In general, the gaming network 506 can include a plurality of EGMs each with a native or legacy external device configuration interface under control of an EGM game controller. The external device configuration interface specifies the hardware and software used by the EGM game controller for communications. All or a portion of the EGMs can communicate via a secondary gaming device, such as described above. The secondary gaming device can implement the EGM external device configuration for communications with the EGM. However, the secondary gaming device can implement a secondary external device configuration which differs from the EGM external device configuration. The EGM external device configuration and the secondary external device configuration can vary from EGM to EGM and secondary gaming device to secondary gaming device.

In particular embodiments, a current secondary external device configuration for an EGM, such as adding a new connection to a server or removing a current connection to a server can be implemented via operator communications with the secondary gaming device. Because the secondary gaming device can be configured to emulate EGM hardware and software communications including the native EGM external device configuration, the connections in the secondary external device configuration may be modified without modifying the EGM software. For example, via the secondary external device configuration and software executed on a secondary gaming device coupled to the EGM, an EGM originally not configured to provide progressive jackpot capabilities can be modified to communicate with a wide area progressive server or a link progressive server without modifying the EGM software. As another example, an EGM originally configured to communicate to a first wide area progressive server in a first communication protocol can be configured to communicate with a second wide area progressive server in a second communication protocol without modifying the EGM software.

One or more devices in network 506 can be configured to provide the multiplexing of the data streams from the gaming system servers and then encrypt the resultant data stream before transmitting. The data streams can be encrypted to prevent tampering and misuse of any data sent in the data streams. The wireless gaming network 506 may use one or more common wireless technologies such as Zigbee, 802.11 a/b/g/n, and 3G/4G. Also, optical transmission technologies, such as IR and laser, can be utilized alone or in combination with other transmission technologies. In other embodiments, power-line transmission technologies or other wired communication technologies can also be utilized alone or in combination with one or more different wireless technologies as part of a gaming network.

Existing gaming systems typically may use some form of a protocol stack. There are standard gaming protocols, such as S2S, G2S developed by the Gaming Standards Association (GSA) and SAS developed by IGT as well as many other proprietary protocols used in the gaming industry. The protocols are used by gaming systems, such as a player tracking system or a TITO system, to communicate data between the gaming machine and servers across a network. The gaming systems may also use encryption to protect data in transit. All of the gaming system's protocols and encryption techniques must be tested and approved by a gaming test lab and/or gaming control board to operate in their jurisdictions. In order to maintain integrity and security it is important not to tamper with or change the data streams of these gaming systems. The gaming system can be configured to provide a non-intrusive technique to transmit and receive the data provided by the various systems, i.e., without a modification to an existing protocol that would require additional testing and approval.

In yet another embodiment, one or more of the internal servers 508 can be configured to communicate with gaming tables, such as 512, or the EGMs, such as 450*a* and 450*b* and other devices, such as gaming kiosks, signage and machines for redeeming cashless tickets for cash. The gaming tables can include an embodiment of one of the secondary gaming devices described herein (e.g., see FIGS. 4 and 5). The one or more servers 508 can be used to provide some of the real time changes to the entertainment, informational and promotional opportunities available on a gaming machine, such as 450*a* or 450*b*, or on one of the gaming tables 512. For instance, promotional tickets can be printed at gaming tables and gaming machines in a dynamic manner using one or more of the internal servers 508. As another example, tournaments or other group games can be provided using one or more of the internal servers 508. In yet another example, promotional activities can involve a combination of game play at a gaming table and an EGM. For example, a promotion and/or bonus can be triggered at an EGM based upon previous game play on other EGMs and/or gaming tables. Further, a promotion and/or bonus can be triggered at a gaming table based upon previous game play at other gaming tables and/or EGMs.

Figure 11:
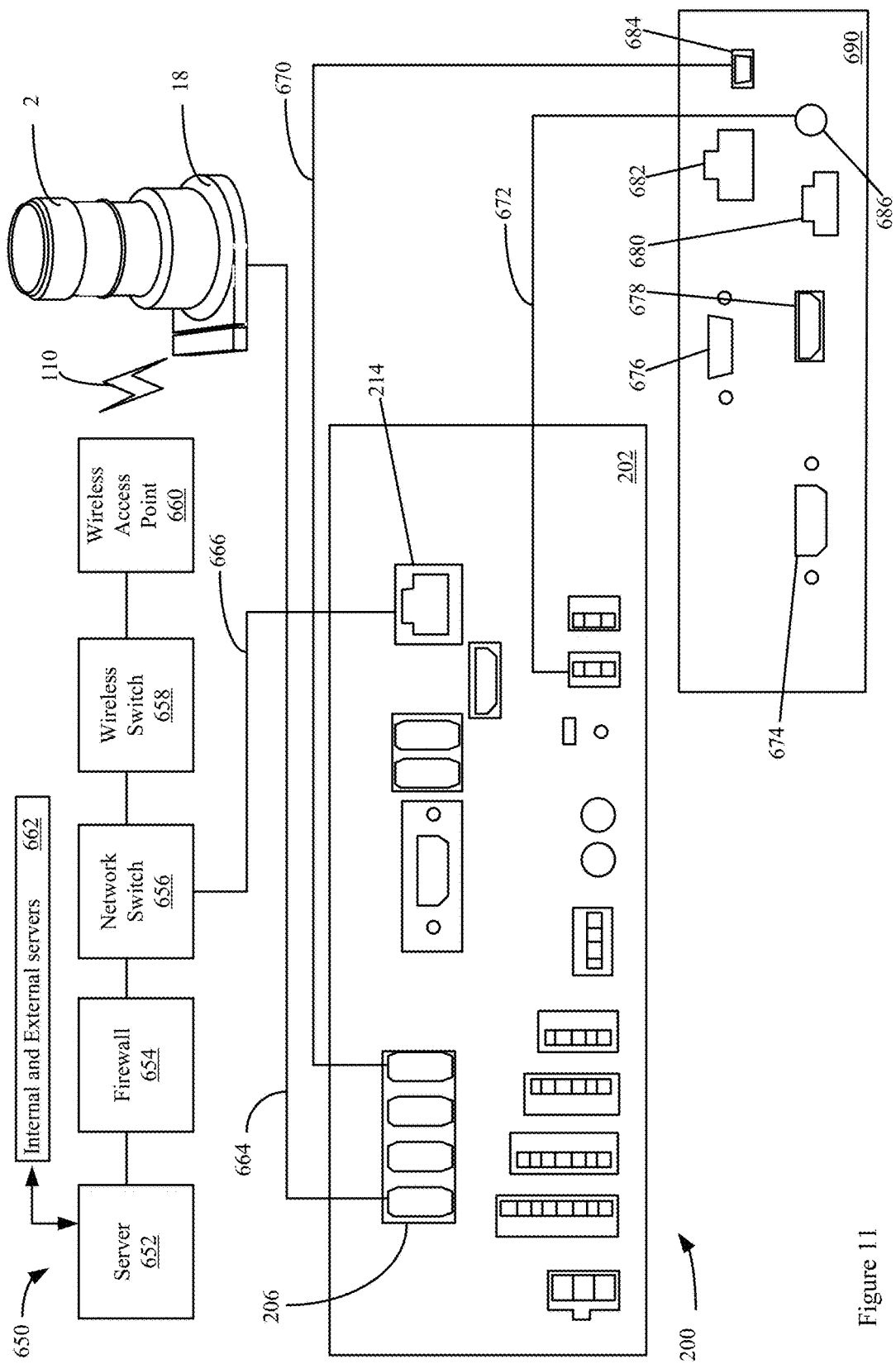
FIG. 11 is a diagram of gaming system configured to provide picture in a picture gaming services on electronic gaming machines in accordance with the described embodiments.

FIG. 11 is a diagram of gaming system configured to provide picture in a picture (PIP) gaming services on EGMs. In FIG. 11, the secondary gaming device 200 is shown connected to a network switch 656 via a wired communication connection 666 from port 214. In addition, via one of the USB ports 206, the radio candle mount 18 can be used to establish wireless communications 110 between the secondary gaming device 200 and a remote server, such as 602. The wireless communications 110 are received via wireless access point 660. In a casino environment, numerous wireless access points can be provided.

The wireless access point 600 is coupled to a wireless switch 658, which is coupled to the network switch 656. Communications from the network switch 656 pass through a firewall 654 to server 652. In one embodiment, server 652 can be used to monitor information from different gaming devices, which reside on numerous different EGMs. Further, the server 652 can be configured to send commands to and provide various services to a plurality of different secondary gaming device. In one embodiment, access to various internal external servers 662 can be provided via server 652.

In a retrofit situation where an EGM is retrofit with a secondary gaming device, the EGM controller can execute software which specifies communications with a first set of servers. EGM software can specify what information is transmitted to each server, what communication channel is to be utilized, what communication protocol is to be utilized and what information can be received. The secondary gaming devices, such as 200, can act as an intermediary device which is configured to receive the communications in the manner proscribed by the EGM hardware and software and respond to the communications as expected by the EGM controller. Thus, the secondary gaming device 200 emulates the external communication and functions expected by the EGM controller on the EGM, i.e., the EGM external device configuration is emulated. The external communications that are emulated can vary from EGM to EGM.

The secondary gaming device 200 can receive communications from an external gaming device and the EGM and modify it in different ways. For example, an upgraded player tracking system may use a communication protocol between an external device and the secondary gaming device which is different than an older communication protocol that the EGM controller utilizes. The secondary gaming device can be configured to convert communications from the EGM controller to be compatible with the new communication protocol and convert communications from an external device to the EGM in the new communication to the communication protocol which the EGM accepts.

The external device configuration of the EGM controller emulated on the secondary gaming device 200 allows the actual external device configuration to be different than the configuration for which the EGM hardware and software is configured. For example, the EGM can include two hardware communication connections and software for communicating in two different protocols with two separate servers. The portion of the secondary gaming device facing the EGM can be configured to communicate with the EGM via the hardware interfaces and software protocols native to the EGM and the EGM controller. However, on the portion of the secondary gaming device facing the external devices. The actual external device configuration may be different than the native EGM configuration. For example, rather than communicating with two separate servers, the secondary gaming device may communicate with a single server using communication protocols different than what the EGM is configured to use.

Ad described above, the secondary gaming device 200 can be used to support picture in picture (PIP) functions on an EGM. In one embodiment, the secondary gaming device 200 can be coupled to another secondary gaming device 690, which supports some of the PIP functions. For example, device 690 can be used to support receiving and modifying EGM controller generated audio, video and touch screen data under control of the secondary gaming device, alone or in combination with a remote server. For example, device 690 can be used to shrink a size of the EGM video data and output it with video data received from the secondary gaming device, such as in the PIP mode described in FIG. 7.

Further, device 690 can be used to route touches detected from a touch screen on the EGM to the secondary gaming device 200. The touches may correspond to touch screen buttons output in the video data received from the secondary gaming device. In addition, the device 690 can be configured to interpolate touch screen data associated with the EGM video data when the data has been shrunk to a native resolution expected by the EGM controller.

The EGM controller can be configured to respond to or ignore touches from different locations on a touch screen. When the EGM controller video data is scaled, such as shrunk in size, the touch locations which are active change positions on the display. Thus, the interpolation can involve translating touch locations associated with video data with a first resolution to touch locations associated with video data with a second resolution, such as the native resolution of the video data generated by the EGM controller.

In FIG. 11, device 690 is configured to receive power from device 200 via connection 672 to power port 686. The device 200 can be configured to send video data to device 690 via one of the USB ports 206. In this example, connection 670 is used to transfer video data from a USB port to a mini-USB port 684. In an alternate embodiment, port 678, which is an HDMI compatible port, can be used to receive video and/or audio data from device 200.

Ports 676 and 682 can be used to send touch screen data to an EGM controller. Port 676 supports an RS-232C serial format. Ports 682 supports a communication format associated with some IGT machines. Additional ports (not shown) are used to receive touch screen data from a touch screen display in the formats associated with ports 676 and 682. Other touch screen formats are possible. Thus, these examples are provided for the purposes of illustration only.

Port 674 can be used to receive video data generated under control of an EGM controller and sent to a touch screen display. An additional port (not shown) is used to output video data from device 690 to the touch screen display. The video data from device 690 can include only the video content received from the EGM, only the video content received from the device 200 or a combination of the video content received from the EGM and the device 200. For example, the video data from device 200 and the EGM can be combined in a PIP format as described above. In one embodiment, in a retrofit, the video and touch screen data modifications as well as any functions performed by device 200 can be performed without modifying the gaming software existing on and executed by the EGM controller prior to the retrofit.

The hardware, methods and interfaces described above are not limited for use on wager-based gaming machines. In alternative embodiments, hardware, methods and/or interfaces can be implemented in a kiosk, a vending machine or an Automatic Teller Machine. The various aspects, embodiments, implementations or features of the described embodiments can be used separately or in any combination. Various aspects of the described embodiments can be implemented by software, hardware or a combination of hardware and software.

The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, flash memory, memory sticks, magnetic tape, and optical data storage devices. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A gaming device comprising:
a housing;
at least one security sensor disposed within the housing, said at least one security sensor configured to measure data which indicates a breach of the housing;
a mounting mechanism, coupled to the housing, and configured to secure the gaming device within an interior of an electronic gaming machine cabinet of a wager-based electronic gaining machine;
a gaming device controller including a processor and a memory device disposed within the housing, wherein the gaming device controller is configured to:
monitor the at least one security sensor to determine whether a breach of the housing has occurred,
receive a command, via a first data connector disposed within the housing, to initially configure the gaming device to operate with a first model of wager-based electronic gaming machine;
receive data, via a second data connector disposed within the housing, associated with a play of a wager-based game from an electronic gaining machine controller disposed within the electronic gaming machine cabinet of the electronic gaining machine;
communicate, via a third data connector disposed within the housing, with a value input device disposed within the electronic gaming machine cabinet and communicatively coupled to the electronic gaming machine controller;
communicate, via a fourth data connector disposed within the housing, with a value input output device disposed within the electronic gaming machine cabinet and communicatively coupled to the electronic gaining machine controller; and
communicate, via a network connector disposed within the housing, with at least one remote device via the network connector;
receive, via one of a fifth data connector disposed within the housing and a sixth data connector disposed within the housing, touch screen data from a touch screen display,
receive, via a seventh data connector disposed within the housing, first video data from the electronic gaming machine controller associated with the play of the wager-based game;

send, via an eighth data connector disposed within the housing, modified touch screen data to the electronic gaming machine controller, wherein the modified touch screen data is based upon the received touch screen data;

generate, based upon the received touch screen data, second video data; and output, via a ninth data connector disposed within the housing, third video data to the touch screen display, wherein the third video data is based on the received command, and the third video data includes portions of the first video data and the second video data; and a power connector disposed within the housing, and configured to receive power from a power source within the electronic gaming machine cabinet wherein the processor receives the power via the power connector.

2. The gaming device of claim 1, wherein a portion of the housing includes a plurality of apertures wherein the first data connector, the second data connector, the third data connector, the fourth data connector, the network connector, the power connector, the fifth data connector, the sixth data connector, the seventh data connector, the eight data connector and the ninth data connector are each accessible via one of the plurality of apertures in the portion of the housing.

3. The gaming device of claim 2, wherein the housing is box-shaped and the plurality of apertures of the housing are each located on a first side of the box-shaped housing such that the box-shaped housing is mountable to a surface within the electronic gaining machine cabinet via any one of remaining sides of the box-shaped housing.

4. The gaming device of claim 2, wherein the housing is box-shaped and the plurality of apertures of the housing are each distributed between a first side of the box-shaped housing and a second side of the box-shaped housing such that the box-shaped housing is mountable, via the mounting mechanism, to a surface within the electronic gaming machine cabinet via any one of remaining sides of the box-shaped housing.

5. The gaming device of claim 1 wherein the first data connector, the second data connector, the third data connector, the fourth data connector, the network connector, the power connector, the fifth data connector, the sixth data connector, the seventh data connector, the eight data connector and the ninth data connector each face in a common direction.

6. The gaming device of claim 1, wherein the gaming device controller is configured to communicate, via a tenth connector, with a card reader.

7. The gaming device of claim 6, wherein tenth connector is coupled to a communication pathway between the card reader and a player tracking controller and the player tracking controller and the gaming device controller are configured to receive and respond to card reader data from the card reader.

8. The gaming device of claim 1, wherein the gaming device controller is configured to:

generate video data associated with an initial configuration of the gaming device during an installation process of the gaming device, and output, via a tenth data connector, the video data associated with the initial configuration.

9. The gaming device of claim 1, wherein the gaming device includes at least one of: a keyboard connector, a mouse connector and a combination keyboard and mouse connector which is used during at least one of: installation of the gaming device and maintenance of the gaming device.

10. The gaming device of claim 1, wherein the first data connector is configured to receive a download of software executable by at least the gaming device controller.

11. The gaming device of claim 1, wherein the gaming device includes another power connector configured to output power to a second gaming device.

12. The gaming device of claim 1, wherein the gaming device controller is configured to receive, via a tenth connector, audio data from a microphone.

13. The gaming device of claim 1, wherein the gaming device controller is configured to send, via a tenth data connector disposed within the housing, first audio data to an audio amplifier disposed within the electronic gaming machine cabinet, wherein the audio amplifier is communicatively coupled to the electronic gaming machine controller and configured to receive second audio data from the electronic gaming machine controller to output.

14. The gaming device of claim 1, wherein the gaming device controller is configured to receive fourth video data from at least one network device.

15. The gaming device of claim 14, wherein the third video data includes at least a portion of the fourth video data.

16. The gaining device of claim 1, wherein the gaining device controller is configured to:

receive the first video data in a native resolution, scale the received first video data to a second resolution different from the native resolution, and output the scaled first video data as part of the third video data.

17. The gaming device of claim 16, wherein the second resolution is less than the native resolution.

18. The gaming device of claim 17, wherein the gaming device controller is configured to:

determine a location on the touch screen display to output the scaled first video data, and generate the third video data such that the scaled first video data is output to the determined location.

19. The gaming device of claim 16, wherein:

the scaled first video data is output, as part of the third video data, on a portion of the touch screen display, and the gaming device controller is configured to:

determine a portion of the received touch screen data which maps to the portion of the touch screen display, scale the portion of the received touch screen data to the native resolution of the first video data, and send the scaled portion of the touch screen data as the modified touch screen data.

20. The gaming device of claim 1, wherein the gaming device controller is configured to:

determine at least one location on the touch screen display to output the second video data, and generate the third video data such that the second video data is output to the at least one location on the touch screen display.

21. The gaming device of claim 1, wherein the gaming device controller operates without modification to software executed by the electronic gaming machine controller prior to a retrofit of the electronic gaming machine.

22. The gaming device of claim 1, further comprising a power reset device coupled to an electronic gaming machine controller power source, wherein the power reset device is configured to:

receive a command from the gaming device controller, and in response to the received command, interrupt power from the electronic gaming machine controller power source to the electronic gaming machine controller.

23. The gaming device of claim 1, wherein the gaming device controller is configured to:

communicate, via a tenth connector disposed within the housing, with a power reset device, and command the power reset device to interrupt the power from the power source to the electronic gaming machine controller.

* * * * *